(12) United States Patent
Ganzi et al.

(10) Patent No.: US 11,655,166 B2
(45) Date of Patent: May 23, 2023

(54) WATER TREATMENT OF SODIC, HIGH SALINITY, OR HIGH SODIUM WATERS FOR AGRICULTURAL APPLICATION

(71) Applicant: Evoqua Water Technologies LLC, Pittsburgh, PA (US)

(72) Inventors: Gary C. Ganzi, Lexington, MA (US); Frederick C. Wilkins, Pepperell, MA (US); Li-Shiang Liang, Harvard, MA (US); Paul T. Rice, Sewickley, PA (US)

( * ) Notice: Subject to any disclaimer, the term of this patent is extended or adjusted under 35 U.S.C. 154(b) by 0 days.

(21) Appl. No.: 16/613,306

(22) PCT Filed: May 8, 2018

(86) PCT No.: PCT/US2018/031588
§ 371 (c)(1),
(2) Date: Nov. 13, 2019

(87) PCT Pub. No.: WO2018/208768
PCT Pub. Date: Nov. 15, 2018

(65) Prior Publication Data
US 2020/0198995 A1    Jun. 25, 2020

Related U.S. Application Data

(60) Provisional application No. 62/560,417, filed on Sep. 19, 2017, provisional application No. 62/502,957, filed on May 8, 2017.

(51) Int. Cl.
*C02F 9/00* (2006.01)
*C02F 1/469* (2023.01)
(Continued)

(52) U.S. Cl.
CPC ............ *C02F 1/4693* (2013.01); *B01D 61/44* (2013.01); *C02F 9/00* (2013.01); *C02F 1/004* (2013.01);
(Continued)

(58) Field of Classification Search
None
See application file for complete search history.

(56) References Cited

U.S. PATENT DOCUMENTS 1,840,105 A * 1/1932 Kean .................. C02F 1/4604
                                                      204/518
2,848,402 A * 8/1958 de Haas van Dorsser ..................
                                                      B01D 61/50
                                                      204/520
(Continued)

FOREIGN PATENT DOCUMENTS

CN          101500948 A       8/2009
CN          104478044 A       4/2015
(Continued)

OTHER PUBLICATIONS

Lesch, et al., "A Short Note On Calculating the Adjusted Sar Index," Transactions of the ASABE, vol. 52(2): 493-496 (Year: 2009).*
(Continued)

*Primary Examiner* — Chester T Barry

(57) ABSTRACT

A method of providing water suitable for irrigation use includes feeding pre-treated water to an electrodialysis apparatus, treating the pre-treated water in the electrodialysis apparatus by selectively removing either one or both of monovalent anionic and monovalent cationic species from the pre-treated water while retaining either one or both of multivalent anionic and multivalent cationic species to produce a treated water stream having a lower ratio of monovalent ions to multivalent ions than the pre-treated water, and directing the treated water into an irrigation water distribution system.

41 Claims, 8 Drawing Sheets

(51) Int. Cl.
*B01D 61/44* (2006.01)
*C02F 1/00* (2023.01)
*C02F 1/20* (2023.01)
*C02F 1/52* (2023.01)
*C02F 1/66* (2023.01)
*C02F 1/74* (2023.01)
*C02F 101/10* (2006.01)
*C02F 101/20* (2006.01)
*C02F 103/08* (2006.01)

(52) U.S. Cl.
CPC .............. *C02F 1/20* (2013.01); *C02F 1/5236* (2013.01); *C02F 1/66* (2013.01); *C02F 1/74* (2013.01); *C02F 2101/101* (2013.01); *C02F 2101/203* (2013.01); *C02F 2101/206* (2013.01); *C02F 2103/08* (2013.01)

(56) References Cited

U.S. PATENT DOCUMENTS

| | | | | |
|---|---|---|---|---|
| 2,848,403 | A * | 8/1958 | Rosenberg | B23Q 16/065 204/525 |
| 4,063,419 | A | 12/1977 | Garrett | |
| 5,338,456 | A | 8/1994 | Stivers | |
| 5,858,191 | A * | 1/1999 | DiMascio | B01D 61/48 204/524 |
| 6,651,383 | B2 * | 11/2003 | Grott | C09K 17/02 47/58.1 SC |
| 7,820,024 | B2 * | 10/2010 | Freydina | C02F 1/469 204/632 |
| 8,277,627 | B2 * | 10/2012 | Ganzi | B01D 61/425 204/520 |
| 2002/0104804 | A1 * | 8/2002 | Grott | C09K 3/185 210/739 |
| 2005/0263457 | A1 * | 12/2005 | Wilkins | C02F 1/283 210/748.11 |
| 2006/0016762 | A1 | 1/2006 | Cha et al. | |
| 2007/0051684 | A1 * | 3/2007 | Grebenyuk | B01J 47/08 210/681 |
| 2007/0284251 | A1 * | 12/2007 | Zuback | B01D 61/425 204/518 |
| 2007/0284252 | A1 * | 12/2007 | Ganzi | B01D 61/425 204/627 |
| 2007/0295604 | A1 * | 12/2007 | Freydina | C02F 1/469 204/518 |
| 2010/0116663 | A1 * | 5/2010 | Davis | B01D 61/44 204/528 |
| 2011/0284376 | A1 | 11/2011 | Ng et al. | |
| 2013/0008791 | A1 * | 1/2013 | Ganzi | B01D 61/425 204/536 |
| 2013/0015135 | A1 * | 1/2013 | Ganzi | C02F 1/469 210/650 |
| 2016/0205960 | A1 * | 7/2016 | Tobin | A23C 9/1427 |
| 2016/0265085 | A1 * | 9/2016 | Bourassa | C25B 9/08 |
| 2017/0150685 | A1 * | 6/2017 | Brant | B01D 65/08 |
| 2017/0361279 | A1 * | 12/2017 | Ganzi | B01D 61/48 |
| 2017/0362102 | A1 * | 12/2017 | Ganzi | C02F 1/4695 |
| 2019/0070561 | A1 * | 3/2019 | Ganzi | A01G 25/00 |
| 2019/0263697 | A1 * | 8/2019 | Ganzi | C02F 9/00 |
| 2020/0198995 | A1 * | 6/2020 | Ganzi | C02F 1/4693 |
| 2020/0299165 | A1 * | 9/2020 | Lahav | C02F 9/00 |

FOREIGN PATENT DOCUMENTS

| | | | |
|---|---|---|---|
| CN | 104838043 | A | 8/2015 |
| CN | 106430785 | A * | 2/2017 |
| ES | 2282043 | A1 | 10/2007 |
| JP | H11262771 | A | 9/1999 |
| JP | 2000051865 | A | 2/2000 |
| JP | 2008500170 | A | 1/2008 |
| JP | 2009539402 | A | 11/2009 |
| JP | 3164558 | U | 12/2010 |
| RU | 2151951 | C1 * | 6/2000 |
| RU | 2004137231 | A | 6/2006 |
| WO | 2010068578 | A1 | 6/2010 |
| WO | 2014188450 | A1 | 11/2014 |
| WO | 2016019459 | A1 | 2/2016 |

OTHER PUBLICATIONS

"First Office Action", issued by the China National Intellectual Property Administration regarding related Chinese Patenl Application No. 201880030827.3, dated Jul. 2, 2021, 14 pages.

"Examination Report" issued by Saudi Arabia Office regarding related Patent Application No. 519410379, dated Jan. 24, 2022, 11 pages.

"Second Office Action", issued by the China National Intellectual Property Administration regarding related Chinese Patent Application No. 201880030827.3, dated Jan. 30, 2022, 19 pages.

Vasava, Vinod P., "Examination Report" regarding related Indian Patent Application No. 201917041957, dated Mar. 2, 2022, 6 pages.

Yamazaki N., "Notification of Reasons for Refusal", regarding related Japanese Patent Application No. 2019-556182, dated Aug. 2, 2022, 8 pages.

* cited by examiner

WATER TREATMENT OF SODIC, HIGH SALINITY, OR HIGH SODIUM WATERS FOR AGRICULTURAL APPLICATION

RELATED APPLICATIONS

This application claims priority under 35 U.S.C. § 119(e) to U.S. Provisional Application Ser. No. 62/502,957, titled "WATER TREATMENT OF SODIC, HIGH SALINITY, OR HIGH SODIUM WATERS FOR AGRICULTURAL APPLICATIONS," filed on May 8, 2017, and to U.S. Provisional Application Ser. No. 62/560,417, titled "WATER TREATMENT FOR AGRICULTURAL APPLICATIONS," filed on Sep. 19, 2017, each which is herein incorporated by reference in its entirety.

BACKGROUND

1. Field of Disclosure

Aspects and embodiments disclosed herein are directed generally to systems and methods of providing crop irrigation water as well as potable water and, more particularly, to systems and methods of providing irrigation water and/or potable water from water having unacceptable dissolved solids content.

2. Discussion of Related Art

Desalting or desalination refers to a water treatment process that removes salt from, for example, water. In some instances, the water source is brackish or seawater and desalting techniques thereof provides at least a portion of municipal requirements for potable, drinking water. Desalination techniques typically include those based on distillation as well as reverse osmosis techniques. The desalted water can also be consumed in commercial and industrial applications as, for example, process feed water, boiler feed water, potable water, drinking water, and irrigation water. Particular examples of industries that may utilize desalted water include the pharmaceutical, mining, paper and pulp, and agricultural industries.

SUMMARY

Aspects and embodiments disclosed herein involve a method comprising introducing water to be treated into an electrically-driven separation apparatus to provide irrigation water having a sodium adsorption ratio (SAR or RNa) value of less than about 20. The SAR value can be determined according to the formula, $$SAR = \frac{[Na^+]}{\sqrt{([Ca^{2+}] + [Mg^{2+}])}}$$

where [Na] is the sodium species concentration, in mol/m$^3$, in the irrigation water, [Ca] is the calcium species concentration, in mol/m$^3$, in the irrigation water, and [Mg] is the magnesium species concentration, in mol/m$^3$, in the irrigation water.

Other aspects and embodiments involve an irrigation system comprising an electrically-driven separation apparatus fluidly connected to a source of water to be treated and an irrigation water distribution system fluidly connected to the electrically-driven separation apparatus.

In accordance with an aspect of the present disclosure there is provided a method of providing water suitable for irrigation use, re-use, and/or further use. The method comprises feeding pre-treated water to an electrodialysis apparatus, treating the pre-treated water in the electrodialysis apparatus by selectively removing either one or both of monovalent anionic and monovalent cationic species from the pre-treated water while preferentially retaining either one or both of multivalent anionic and multivalent cationic species to produce a treated water stream having a lower ratio of monovalent ions to multivalent ions than the pre-treated water, and directing the treated water into an irrigation water distribution system.

In some embodiments, the method further comprises producing treated water having a lower sodium absorption ratio (SAR) value than the pre-treated water and a concentrated water stream having a higher SAR value than the pre-treated water. The method may comprise producing treated water having a SAR value below 20.

In some embodiments, the method further comprises applying a voltage across an anode and a cathode of the electrodialysis apparatus above an active polarization voltage at the anion selective membrane of the electrodialysis apparatus. As the term is used herein, an active polarization voltage is a DC operating voltage applied to any given electrodialysis apparatus which, in combination with a diluting water stream and concentrating water stream of any given constituent makeup and any given operating conditions of flow rate and temperature through the diluting and concentrating compartments, creates a localized voltage gradient at or near the surface of at least one of the anion or cation selective ion exchange membranes. The active polarization voltage is capable of causing a localized chemical change or dissociation to one or more of the diluting stream feed ionic or non-ionic constituents, including but not limited to dissolved solutes and/or water. The method may further comprise flowing the pre-treated water through diluting compartments of the electrodialysis apparatus at a flow rate sufficient to cause a pH of the treated water to be lower than a pH of the pre-treated water and pH of the interstitial water in the anion selective membrane to have an elevated pH with respect to the treated water In some embodiments, the method further comprises applying a voltage across an anode and a cathode of the electrodialysis apparatus above an active polarization voltage at the anion permeable membrane of the electrodialysis apparatus. The method may further comprise flowing the pre-treated water through diluting compartments of the electrodialysis apparatus at a flow rate sufficient to cause a pH of the treated water to be lower than a pH of the pre-treated water.

In some embodiments, the method further comprises applying a voltage across an anode and a cathode of the electrodialysis apparatus above an active polarization voltage at a cation permeable membrane of the electrodialysis apparatus. The method may further comprise flowing the pre-treated water through the diluting compartments of the electrodialysis apparatus at a flow rate sufficient to cause a pH of interstitial water in the cation permeable membrane to have a lower pH with respect to the treated water.

In some embodiments, the method further comprises applying a voltage across an anode and a cathode of the electrodialysis apparatus at a selected active depleting stream voltage gradient. The method may further comprise operating the electrodialysis apparatus at a selected ion depleting membrane surface velocity, pH condition, temperature, polarization condition, and/or relative boundary layer concentration conditions of specific multivalent anions and/or cations relative to monovalent anions and/or cations whereby anionic or cationic intermediates or ionic complexes are formed at the membrane surfaces. The anionic or cationic intermediates or ionic complexes may be formed in connection with in-situ production of hydrogen or hydroxide ions or preferentially with respect to any in-situ production of hydrogen or hydroxide ions. The anionic or cationic intermediates or complexes may become relatively more or less permeable or impermeable through either or both of the anionic or cationic selective membranes than these anions and/or cations or neutral constituents would be under equilibrium well-mixed conditions in the absence of an electric field.

As the terms are used herein, multivalent anions and/or cations include divalent anions and/or cations. As described herein, the valence state of an ion is classified as either multivalent or monovalent as the valence state at equilibrium of a well-mixed solution in the absence of an electric field.

In some embodiments, feeding the pre-treated water to the electrodialysis apparatus comprises feeding pre-treated water including monovalent and divalent anions and cations to the electrodialysis apparatus.

In some embodiments, feeding the pre-treated water to the electrodialysis apparatus comprises feeding a pre-treated one of seawater, brackish water, fresh water, and produced water to the electrodialysis apparatus. As the terms are used herein, seawater is water derived from the ocean, typically with a total dissolved solids (TDS) level of between about 20,000 ppm and about 40,000 ppm, and more typically about 35,000 ppm. Brackish water is water having a TDS level of between about 1,000 ppm and about 10,000 ppm. Saline water or salt water has more than 10,000 ppm TDS. Brine is very salty water having a TDS greater than about 35,000 ppm. Potable water typically has a TDS of less than about 1000 ppm, and preferably less than about 500 ppm.

In some embodiments, feeding the pre-treated water to the electrodialysis apparatus comprises feeding water having a greater molal concentration of sodium ions than a concentration of calcium ions to the electrodialysis apparatus.

In some embodiments, feeding the pre-treated water to the electrodialysis apparatus comprises feeding water having a greater molal concentration of chloride ions than a concentration of sulfate ions to the electrodialysis apparatus.

In other embodiments, feeding pre-treated water to the electrodialysis apparatus comprises feeding water having a greater molal concentration of sodium ions than a concentration of chloride ions to the electrodialysis apparatus.

In other embodiments, feeding pre-treated water to the electrodialysis apparatus comprises feeding water having a greater molal concentration of sulfate ions than a concentration of chloride ions.

In some embodiments, selectively removing a fraction of one or both of the monovalent anionic and the monovalent cationic species from the pre-treated water comprises removing ions of sodium, potassium, chloride, bicarbonate, nitrate, hydrogen selenate, hydrogen selenite, or other monovalent ionic species from the pre-treated water relative to the fraction removal of multivalent ionic species. Retaining a fraction of the one or both of the multivalent cationic and the multivalent anionic species in the pre-treated water may comprise retaining one or more of ions of magnesium, calcium, strontium, carbonate, selenate, selenite, sulfate, or other multivalent ionic species from the pre-treated water relative to the fraction removal of monovalent ionic species.

In some embodiments, the method may comprise operating the electrodialysis apparatus at a current efficiency of at least about 70%, and preferably at a current efficiency of at least about 85%. The method may comprise operating the electrodialysis apparatus under conditions such as above an active polarization voltage in which hydrogen ions are produced at an anion ion selective membrane of a diluting compartment of the electrodialysis apparatus and/or in which hydroxide ions are produced at a cation ion selective membrane of a diluting compartment of the electrodialysis apparatus.

The method may further comprise operating the electrodialysis apparatus under active polarization voltage conditions in which hydrogen sulfate ($HSO_4^-$), bicarbonate ($HCO_3^-$), borate ($H_2BO_3^-$), hydrogen selenate ($HSeSO_4^-$) or hydrogen selenite ($HSeO_3^-$) ions pass through a monovalent anion selective membrane into a concentrating compartment of the electrodialysis apparatus and/or ionic complexes such as calcium hydrogen boron ($CaH_2BO_3^+$) or magnesium hydrogen boron ($MgH_2BO_3^+$) may pass through the cation monovalent selective membrane into a concentrating compartment of the electrodialysis system.

In some embodiments, the method may further include pre-treating the untreated feed water to the electrodialysis device and/or the pre-treated water to the diluting stream inlet of the electrodialysis device using a filter to remove particulate matter greater than nominal size of 50 micrometers, 25 micrometers, 10 micrometers, or 1 micrometer using filters and combinations of filters such as screen filters, bag filters, media filters, carbon filters, sand filters, pre-coat filters, cartridge filters, and/or membrane filters.

In some embodiments, the method may further comprise adding an acid, for example, sulfuric acid or hydrochloric, to the water entering a diluting compartment of the electrodialysis apparatus from a source external to the electrodialysis apparatus.

The method may further comprise adding one of sulfuric acid or hydrochloric acid to pre-treated water entering as feed water to the electrodialysis apparatus from a source external to the electrodialysis apparatus.

In some embodiments, the method may further comprise producing the pre-treated water from untreated feed water by adding sulfuric acid or hydrochloric acid to the untreated feed water or to the water after it is partially or fully pre-treated and ultimately fed to the diluting stream and concentrating stream compartments.

In some embodiments, the method may further comprise producing the pre-treated water from untreated feed water by adding an oxidizing compound such as ozone, chlorine, or chlorine dioxide to the untreated feed or partially untreated feed water and/or treating the water using ultraviolet disinfection alone or in combination.

In some embodiments, the method may further comprise removing carbon dioxide or other dissolved gaseous components from the untreated feed water or partially treated feed water.

Producing the pre-treated water from the untreated feed water may further comprise precipitating and filtering one or more of in-situ oxidizable compounds such as those comprised of iron, manganese, sulfur, selenium, heavy metals, or other inorganic or organic materials from the untreated feed water.

Producing the pre-treated water from the untreated feed water may further comprise creating in-situ oxidizing conditions within the water by aerating the untreated feed water with oxygen-containing gas and/or use of oxidizing and disinfecting compounds such as ozone, chlorine, or chlorine dioxide, or additional treatment via filtration through a media bed comprising an oxidizing media such as manganese greensand. Producing the pre-treated water from the untreated feed water may comprise treating the untreated feed water in a forced draft degasifier, vacuum stripper, and/or one or more chemical feed systems.

In some embodiments the generation of oxidizing compounds or pH adjusting compounds such as chlorine, chlorine dioxide, hydrochloric acid, sulfuric acid, or sodium or potassium hydroxide are accomplished by using constituents of the purified or speciated products of the concentrating stream of the electrodialysis apparatus as raw materials, such as through feed of the relevant constituents for use in one or more electrochemical oxidation/reduction apparatus to produce the chemicals ultimately utilized by the pre-treatment system.

In some embodiments, the method further comprises monitoring a concentration of sodium in the treated water stream, and adjusting an operating parameter of the electrodialysis device to maintain a desired SAR value or sodicity value, or a concentration of a specific ionic or non-ionic constituent in the treated water stream and/or the concentrate water stream. The method may further comprise determining a SAR value or level of potentially toxic (such as nitrate ion for drinking water) or nontoxic constituents (such as nitrate ion for irrigation water) of treated water in the treated water stream, and adjusting an operating current of, or pH of the feed water to the electrodialysis device to maintain the desired SAR value or safe level of potentially toxicity and preferred level of nontoxic constituents or pH in the treated water stream and/or the concentrate water stream.

In some embodiments, the method further comprises utilizing a concentrate stream effluent produced in the electrodialysis device to generate heat or electricity, to produce reagents needed as raw materials to be used to condition and pre-treat the feed water to the electrodialysis apparatus, for reuse of the compounds generated for use in other local processes such as for fracking feed water, or for use in chemical production for other commercial application.

Generating the heat or electricity from the concentrate stream may include directing the concentrate stream into a solar pond to generate heat water to be utilized as the energy source for generation of electricity that may be produced using low temperature generators and the like, and then selectively causing evaporative processes to speciate purified solid chemical compounds for use in other commercial applications. In such implementations where the concentrate stream effluent is further concentrated by evaporation, the electrodialysis apparatus may be configured utilizing monovalent selective anion membranes and operated so as to minimize transfer of potentially toxic multivalent selenite and selenate into the evaporative ponds.

Production of reagents may be accomplished by treating the concentrate water from the electrodialysis apparatus using one of or a combination of other unit process step such as distillation and/or chromatographic ion retardation processes, crystallization, or selective evaporation in order to speciate or purify the production of solids or concentrated liquid solution for further use.

In some embodiments, the method further comprises monitoring electrical resistance of soil to be irrigated with the treated water and adjusting a rate of irrigation of the soil based at least in part on the electrical resistance.

In accordance with another aspect, there is provided a method of operating an electrodialysis apparatus. The method comprises feeding pre-treated water including less than 10 ppm or alternately including less than 5 ppm of elemental boron into a depleting compartment of the electrodialysis apparatus, maintaining a bulk pH of less than 9.5, for example, 8.5, 7.5, 6.5 or less, within the depleting compartment of the electrodialysis apparatus; operating the electrodialysis apparatus under conditions in which at least 50% of the boron in the pre-treated water is removed from the depleting compartment, and discharging treated water from the depleting compartment of the electrodialysis apparatus, the treated water containing a concentration of elemental boron that is at least 50% less than the concentration of elemental boron in the pre-treated water.

In some embodiments, feeding the pre-treated water into the depleting compartment of the electrodialysis apparatus comprises feeding the pre-treated water into an electrodialysis apparatus including a monovalent selective cation membrane.

In accordance with another aspect, there is provided an electrodialysis apparatus. The electrodialysis apparatus comprises an anode, a cathode, an anion exchange membrane, and a cation exchange membrane. At least one of the anion exchange membrane and the cation exchange membrane is monovalent selective. The electrodialysis apparatus further comprises a controller configured to cause the electrodialysis apparatus to operate under conditions in which monovalent ionic species and/or ionic intermediates or ionic complexes are selectively removed from water introduced into the electrodialysis apparatus while multivalent ionic species are retained to produce a treated water stream having a lower sodium absorption ratio (SAR) value, salinity, or toxicity level than the water introduced into the electrodialysis apparatus and a concentrated water stream having a higher SAR value, or salinity than the water introduced into the electrodialysis apparatus, and to apply a voltage across the anode and the cathode above an active polarization voltage of the electrodialysis apparatus. The controller may be further configured to flow the water introduced into the electrodialysis apparatus through diluting compartments of the electrodialysis apparatus at a velocity sufficient to cause water splitting to occur in the electrodialysis apparatus and to cause a pH of the treated water to decrease relative to a pH of the water introduced into the electrodialysis apparatus.

In some embodiments, the electrodialysis apparatus contains a monovalent selective cation membrane.

In some embodiments, the controller is further configured to cause the electrodialysis apparatus to maintain a bulk pH of less than 9.5, or, for example 8.5 or less, or alternately 7.5 or less, or alternately a pH of less than 6.5 within a depleting compartment of the electrodialysis apparatus, and to operate with a voltage across the anode and cathode and a flow rate of pre-treated water through the depleting compartment sufficient to remove at least 50% of boron from the pre-treated water flowed through the depleting compartment and having an elemental boron concentration of less than 10 ppm or, for example, a concentration of less than 5 ppm when introduced into the depleting compartment.

In some embodiments, the anion exchange membrane further comprises a compound including a functional group that increases a tendency and amount of water splitting to occur on the anion exchange membrane as compared to a substantially similar anion exchange membrane not including the compound. The functional group may be a tertiary amine functional group. The compound may include or consist of dimethylethanolamine.

In accordance with another aspect, there is provided an irrigation water system. The system comprises an electrodialysis apparatus including a diluting compartment inlet, a concentrating compartment inlet, a diluate outlet, and a concentrate outlet, an anode and a cathode, and an anion exchange membrane and a cation exchange membrane. At least one of the anion exchange membrane and the cation exchange membrane is monovalent selective. The electrodialysis apparatus further includes a controller configured to cause the electrodialysis apparatus to operate under conditions in which monovalent ionic species are selectively removed from water introduced into the electrodialysis apparatus while multivalent ionic species are retained to produce a treated water stream having a lower sodium absorption ratio (SAR) value than the water introduced into the electrodialysis apparatus and a concentrated water stream having a higher SAR value than the water introduced into the electrodialysis apparatus, and to apply a voltage across the anode and cathode and flow the water introduced into the electrodialysis apparatus through diluting compartments of the electrodialysis apparatus at a velocity sufficient to cause water splitting to occur in the electrodialysis apparatus and to cause a pH of the treated water to decrease relative to a pH of the water introduced into the electrodialysis apparatus. The system further comprises a source of water to be treated fluidly connectable upstream of the diluting compartment inlet and the concentrating compartment inlet, and an irrigation point of use fluidly connectable to the diluate outlet.

In some embodiments, the system further comprises a pre-treatment system in fluid communication between the source of water to be treated and the diluting compartment inlet and concentrating compartment inlet. The pre-treatment system may comprise an inlet connectable to the source of water to be treated, and a source of pH adjustment agent configured to dose the water to be treated with pH adjustment agent at a dosage point. The pre-treatment system may further comprise a degasifier having an inlet downstream of the dosage point. The pre-treatment system may further comprise a particle filter in fluid communication downstream of an outlet of the degasifier and an outlet in fluid communication with the diluting compartment inlet and concentrating compartment inlet of the electrodialysis apparatus.

In some embodiments, the irrigation system further comprises at least one pH sensor disposed one or more of upstream of the degasifier and downstream of the dosage point, or downstream of the degasifier and upstream of the diluting compartment inlet and concentrating compartment inlet.

In some embodiments, the irrigation system further comprises a SAR value sensor configured to determine a SAR value of treated water exiting the diluate outlet. The controller may be further configured to receive an indication of the SAR value of treated water from the SAR value sensor and to control operation of the electrodialysis apparatus to produce treated water having a desirable SAR value.

In some embodiments, the irrigation system further comprises a conductivity sensor configured to measure conductivity of soil at the irrigation point of use. The controller may be further configured to receive an indication of the conductivity of the soil at the irrigation point of use and to adjust a flow rate of treated water to the irrigation point of use based at least in part on the indication of the conductivity of the soil.

In some embodiments, the irrigation system further comprises a specific compound sensor configured to measure a specific ion or specific dissolved constituent concentration or concentrations, and to adjust operating parameters of the pre-treatment system and/or the electrodialysis apparatus to control to a desired input and/or output concentration to and/or from the electrodialysis apparatus diluting stream or concentrating stream.

In some embodiments, the irrigation system further comprises a system in fluid communication with the concentrate outlet and configured to generate one of heat or electricity from a concentrate stream from the electrodialysis apparatus.

In some embodiments, the irrigation system further comprises a system in fluid communication with the concentrate outlet configured to be a source of raw materials to synthesize one or more chemical reagents using the compounds recovered from the electrodialysis apparatus.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
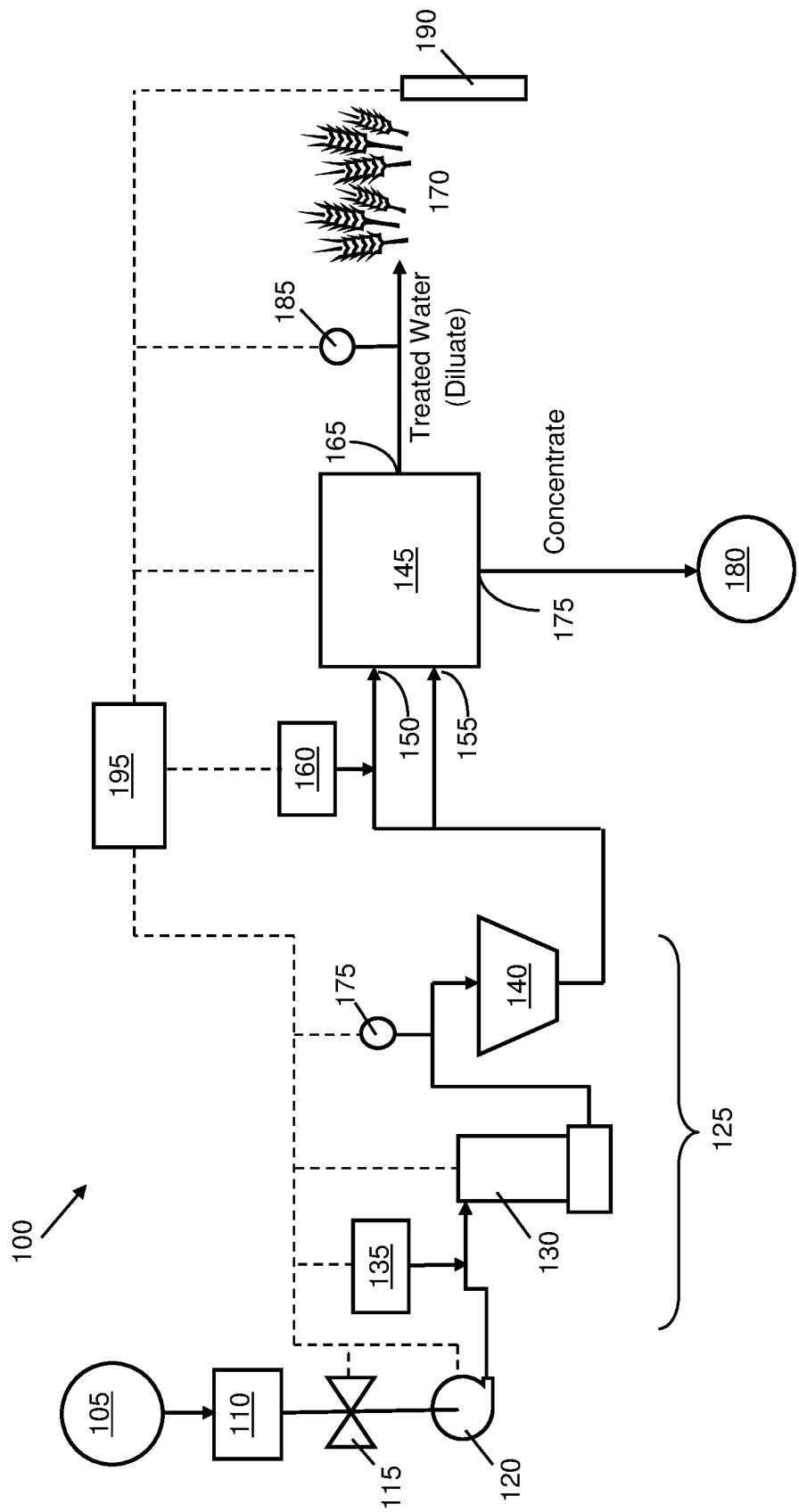
FIG. 1 is a schematic illustration of an embodiment of an irrigation water production and delivery system.

Aspects and embodiments disclosed herein are not limited to the details of construction and the arrangement of components set forth in the following description or illustrated in the drawings. Aspects and embodiments disclosed herein are capable of other embodiments and of being practiced or of being carried out in various ways.

One or more aspects disclosed herein involve systems and techniques for providing water suitable for agricultural facilities. Other aspects disclosed herein can provide potable water or water suitable for human use or consumption as well as for livestock and poultry. Some systems and techniques disclosed herein can convert or otherwise render non-potable water suitable for agricultural, livestock, poultry, and/or human consumption. Still further aspects can involve systems and techniques that preferentially or selectively remove some species over other species from a fluid to be treated to provide a product having one or more desirable characteristics. In contrast with non-selective techniques, some selective removal aspects can be more cost effective by avoiding or reducing additional post-treatment processes such as blending. Thus, the systems and techniques disclosed herein may economically provide treated water that is more suitable for an intended use.

In some embodiments, some types of species are retained in the treated stream while other types of species are preferentially removed. The resultant product fluid can be utilized in various applications and/or otherwise satisfy one or more objectives. Other aspects can involve systems and techniques that provide water having one or more properties or characteristics tailored to satisfy a particular purpose. Some embodiments can thus involve systems and techniques that provide one or more water streams or bodies that have one or more attributes that have been adjusted based on one or more parameters of the point of use or facility in which the stream or body is utilized.

Even further aspects can involve systems and techniques that economically provide water for agricultural, industrial, commercial, and/or residential service. Further, some particular aspects can involve providing water to serve a plurality of requirements or levels of purity or quality. In some embodiments, systems and techniques can provide one or more water streams or bodies in a mixed use facility. Particularly advantageous aspects can involve providing the plurality of water streams or bodies, each of which may have differing water quality levels, from a source of water having high solids content, to a plurality of points of use, each of which may have differing requirements. Such aspects can provide systems and techniques that treat, for example, non-potable water to render it potable and/or suitable for irrigation, for livestock and/or poultry consumption, and/or for human consumption or use.

In some aspects, water having a high level of one or more objectionable species dissolved therein can be treated to remove or at least reduce the concentration of such species to an acceptable level. The one or more objectionable species can be any species that render the untreated feed water unsuitable for a particular application. For example, the water may contain a high level or undesirable concentration of monovalent cations and/or anions which adversely or undesirably hinders retention of water in soil or adsorption of or other species, including, for example, multivalent species. If the requirement is pertinent to crop irrigation, the undesirable condition or characteristic can involve water that contains one or more species that affects the permeability and/or infiltration properties of the soil being irrigated. For example, some aspects can involve rendering or treating water to preferentially remove monovalent species over non-monovalent species.

One or more particular aspects can involve embodiments directed to systems and/or methods comprising providing or introducing water to be treated into an electrically-driven separation apparatus. Some embodiments can involve an irrigation system comprising an electrically-driven separation apparatus fluidly connected, or at least connectable, to one or more sources of water to be treated and at least one irrigation water distribution system.

In other aspects, some embodiments can involve a method of providing potable water. Notably, some aspects can provide irrigation water and/or potable water without thermally-driven separation techniques or unit operations. For example, in some embodiments, the method can comprise one or more acts or steps of providing water to be treated and treating at least a portion of the water to be treated in an electrically-driven separation apparatus to produce a first treated water. The method can further comprise one or more acts of treating a portion of the water to be treated, typically a separate portion, in one or more other electrically-driven or pressure-driven separation apparatus to produce a second treated water. In some embodiments, the method can further comprise a step of mixing the first treated water and the second treated water to produce the potable water. The potable water typically has a target or desired total dissolved solids (TDS) content.

Aspects directed to systems that provide potable water can comprise a source of water to be treated and one or more electrically-driven separation apparatus which can be fluidly connected, or connectable, to the source of water to be treated, to a pressure-driven separation apparatus, or both. For example, as described in further detail below, one or more electrically-driven separation apparatus can be fluidly connected to one or more mixers having one or more inlets fluidly connected, or connectable, to treated water outlets of the one or more electrically-driven separation apparatus. The mixer can comprise any mixing unit operation that facilitates at least partially blending or combining one or more products streams.

The water to be treated can comprise seawater, saline water, brackish water, fresh water, produced water (water that is produced as a byproduct along with oil and gas in an oil or gas well), and/or water containing high concentrations of dissolved solids or salts. Other sources of water to be treated can comprise water that would be unsuitable for use in agricultural facilities because of infiltration and/or toxicity considerations.

The systems and techniques disclosed herein can comprise, where appropriate, pre-treatment subsystems to facilitate one or more operating principles thereof. One or more pre-treatment and post-treatment unit operations may be utilized in one or more embodiments. For example, the systems and techniques disclosed herein may comprise a pre-treatment subsystem comprising one or a plurality of filters that separate or remove at least a portion of any suspended solids in the water to be treated. Such pre-treatment subsystems typically remove particulate material that would damage any downstream unit operation of the systems disclosed herein. Other pre-treatment unit operations include, for example, microfilters as well as sedimentary-based systems that can remove suspended solids that are one micron or greater in size.

Further pre-treatment operations may be utilized to improve the effectiveness of one or more unit operations. For example, a pre-treatment subsystem can comprise cooler or heaters that, respectively, cool or heat the water to be treated prior to separation operations. Cooling of the raw feed stream, or any intermediate process stream may be performed to, for example, facilitate the transport of an undesirable species, or to hinder the transport of a desirable species, from the stream to be treated. Likewise, heating may be performed to raise the temperature of the raw feed stream, or one or more intermediate process streams, to a desired temperature that, for example, facilitates economical or efficient operation of the one or more separation apparatus. Non-limiting examples of heating processes may involve heaters, furnaces, or heat exchangers that may be associated or be a unit operation of a process or system. For example, heating may be provided through a heat exchanger of a power plant that is not necessarily associated with the treatment systems disclosed herein.

Post-treatment unit operations may polish, remove, or reduce the concentration one or more species in the treated water. For example, one or more ion exchange columns may be utilized to remove species that are not readily removed in the electrically-driven separation apparatus. Non-limiting examples of species that would typically be removed or at least have a reduction in concentration to, preferably, non-toxic and/or non-objectionable levels, in post-treatment operations include those that may affect soil aggregation, water infiltration, and/or would be toxic to plant growth such as aluminum, arsenic, beryllium, cadmium, cobalt, chromium, copper, iron, fluoride, lithium, manganese, molybdenum, nickel, lead, selenium, tin, titanium, tungsten, vanadium, boron, and zinc. Other species that may be addressed by one or more post-treatment operations include those that may be toxic or objectionable to humans, poultry, and/or livestock in drinking water such as, but not limited to, nitrates, nitrites, vanadium, and sulfides. Disinfecting processes may also be performed to at least partially inactivate or reduce the concentration of colony-forming microorganisms that may be harmful to humans and/or livestock.

Alternatively, or in combination with the one or more polishing unit operations, systems and techniques may involve adding one or more species to at least a portion of the treated water. For example, gypsum may be added to adjust the concentration of one or more desirable species or adjust a characteristic of the water. Other additives may include fertilizers or other supplements that facilitate crop growth when the water is used for irrigation.

An electrically-driven apparatus typically utilizes a potential field to create a motive force that induces one or more species, typically the target species, which can include desirable as well as undesirable species, to migrate from the carrier or fluid. The electrically-driven apparatus can utilize one or more components that segregate the target species during migration and/or inhibit the return or reverse process. Non-limiting examples of such devices include electrodialysis (ED) devices, including current reversing electrodialysis (EDR) devices, as well as electrodeionization (EDI) devices. As used herein, electrodialysis apparatus includes EDR and EDI apparatus. Aspects and embodiments disclosed herein, however, are not limited to one or a combination of such electrically-driven apparatus and may be practiced in other apparatus that provide a motive force that facilitates the preferential migration of one or more target species over other species in the fluid to be treated.

The electrically-driven separation apparatus typically utilize ion selective membranes to facilitate separation phenomena. In some embodiments, the selectively permeable membranes can preferentially or selectively allow transport of some species relative to other species. For example, cation selective membranes may be utilized in some compartments of the electrically-driven separation apparatus. In other embodiments, anion selective membranes may be utilized in one or more compartments. In still other embodiments, the electrically-driven separation apparatus may comprise one or more monovalent selective membranes to selectively promote transfer of the monovalent cationic or anionic species. For purposes of this disclosure, a monovalent selective membrane is one capable of operating in any given electrodialysis device such that the ratio of transfer of monovalent ions to the transfer of divalent ions on a molal basis is greater than one, under any given controlled operating conditions and given pre-treated diluting stream water comprising equimolal concentrations of divalent and monovalent ions, upon imposition of a DC electric field.

In some embodiments, the separation apparatus may comprise monovalent cation selective membranes and one or more monovalent anion selective membranes, typically in one or more concentrating compartments of the apparatus. Non-limiting examples of commercially available monovalent selective membranes include NEOSEPTA® cation and anion selective membranes from ASTOM Corporation, Tokyo, Japan or Tokuyama Corporation, Tokyo, Japan.

A pressure-driven separation apparatus typically utilizes one or more barriers to inhibit migration of one species therethrough while allowing penetration of another. The motive force facilitating the separation phenomena typically involve pressurizing the fluid to be treated. Non-limiting examples of pressure-driven separation apparatus include microfiltration, nanofiltration (NF) apparatus as well as reverse osmosis (RO) systems.

One of the largest problems facing the agricultural industry is preventing the formation of saline or sodic soils or soils prone to autoeutrophication due to excessive sulfate. Such soils reduce yields of crops or make certain crops difficult or impossible to farm. Saline soils either prevent uptake of water and nutrients or accelerated release of nutrients such as nitrogen and phosphorus into plants and cause leaf burn, etc. Sodic soils and elevated sulfate soils prevent flocculation of soils and cause impermeable soils or soils of elevated pH. It is not only the overall salinity that causes crop damage but also the ratio of particularly problematic constituents such as sodium or chloride or alkalinity, for example, carbonate to relatively benign or helpful constituents such as calcium or sulfate. Presently the agricultural industry cannot accommodate to the costs of completely treating the irrigation water or saline intrusions that are the root causes of saline or sodic soils.

Some aspects and embodiments include an electrodialysis method and system that will selectively remove the problem impurities while maintaining a good fraction of the helpful impurities from water to be treated to produce water useful for irrigation purposes. The method may allow for very high water throughput per unit ED membrane area, thus dramatically reducing the cost of treatment. Further, the method may provide for trouble free operation, because the ions, dissolved silica, and organic materials that normally foul or scale the equipment are not removed and thus do not create problems due to their concentration. Further the method may not only remove the problem ions only, it also may prevent sodic soil creation by inherent lowering of pH of the product water, without need of post-treatment chemical addition.

A typical ground water that produces saline or sodic soil contains high ratios of sodium and chloride ions in relation to calcium and sulfate ions. It may also contain levels of alkalinity that increase the potential for the water when used in irrigation to create sodicity in the soil. Such soil may be treated by amendments such as gypsum with the addition of bulk sulfuric acid. This is at best a stop gap solution because the root cause of the soil problem is the constituent ratios of the irrigation water itself.

Some aspects and embodiments include an electrodialytic treatment of incoming irrigation water with membranes that are monovalent selective. Sodium, chloride, and alkalinity are selectively removed while the calcium and sulfate are maintained for the irrigation water. There is no need to completely remove the sodium and chloride. Desirably, a fraction of the sodium and/or chloride are removed to change the sodium adsorption ratio of the treated water to one that does not ultimately cause saline or sodic soils. The amount of sodium and or calcium removed can be tuned to the particular sensitivity of the crop being grown along with the soil character for flocculation and drainage capability, the amount of leaching rainfall available, and the amount available of calcium and sulfate in the feed water. For example, very sensitive crops such as fruits, nuts, and citrus may be irrigated with water having a SAR value of between 2 and 8, sensitive crops such as beans may be irrigated with water having a SAR value of up to between 8 and 18, moderately tolerant crops such as clover, oats, and rice may be irrigated with water having a SAR value of up to between 18 and 46, and tolerant crops such as wheat, barley, tomatoes, beets, tall wheat grass, and crested grass may be irrigated with water having a SAR value of up to between 46 and 102. In implementations where there is excess sodium and sulfate, embodiments may comprise use of monovalent selective cation membranes and non-selective anion membranes. Scaling potential in the concentrating compartment of the electrodialysis device remains controllable even under such circumstances due to minimization of calcium in the concentrating stream.

Aspects and embodiments disclosed herein provide for very low cost treatment of saline water to produce water suitable for irrigation purposes. This is accomplished not only by partial removal of only the monovalent ions, but also by operating at high voltages (above the polarization level) such that throughput is increased. Because only a small amount of salt may be removed, power consumption may not be a large cost for desalination and thus it is possible to operate at current efficiencies in the 50% range and still be cost effective with higher throughput due to higher salinity removals per unit membrane area. Other embodiments of electrodialysis systems disclosed herein may operate with current efficiencies above about 70% or above about 85%. Because generally speaking, operating electrodialysis systems at current densities disclosed herein, the diluting stream will go or maintain itself as acidic, for example, to a pH of about 6 or below. This provides an added advantage because soils with the potential to become sodic may benefit from pH lowering to prevent that from occurring. The combination of lowering pH and removal of fraction of the monovalents will make the water chemistry ideal for crops instead of harmful.

Because in some embodiments, the anion membrane is monovalent selective, and because there may be sulfate naturally in the water to be treated, the production of hydrogen ions at the anion surface of the diluting stream due to water splitting at low current efficiency operation may create some amount of $HSO_4^-$ ions which may travel to some extent into the concentrate stream. However, this effect will mitigate the anion membrane from becoming basic and thus help protect against scaling by residual alkalinity. Additional external sulfuric acid can be added to the concentrate stream and in combination with polarity reversal as needed will protect against carbonate scale. In embodiments with highly alkaline water, one can pre-treat the feed with sulfuric acid and then remove the resulting carbon dioxide before the water enters the ED. This pre-acidification and carbon removal will increase sulfate content to the product water and not add chloride, and further drop the pH of the product and concentrate to make the product water better for crops and the ED more forgiving to alkaline scaling. There may be no need to then to upwardly adjust pH because low pH is better for the crops in saline or sodic prone soils. The combination may further reduce the amount of sodium and chloride removal relative to calcium and sulfate levels necessary and thus further drive down the cost of the equipment. Alternatively, for feedwaters containing excess sulfate, it may be preferable to acidify utilizing hydrochloric acid.

In another embodiment, the ED equipment could be operated at very high velocity and voltage above the polarization voltage with monovalent cation and non-selective anion permeable membranes. Sodium may thus be removed and the cation membrane may be polarized. This will decrease pH in the cation membrane and concentrate stream and while raising pH at the diluting side of the cation membrane in the diluting stream. This combination of membranes will remove both sulfate and chloride from the diluting stream while operating the ED device without scaling calcium carbonate or magnesium hydroxide. This should be good for sodic soils and those that would precipitate calcium sulfate in the soils. Sodium is sometimes a larger problem for soils than chloride.

This mode of operation may also be preferable for producing agricultural water or other waters when operating with a feed of seawater, since in most seawater, there is excess sodium over chloride on an equivalent basis. In such an implementation it may be desirable to also remove multivalent anions in addition to monovalent anions to remove sufficient sodium to produce water with desired SAR values and to form the active polarization condition at the monovalent selective cation membranes to cause boron to transfer and be removed from the diluting stream through the monovalent selective cation membrane.

Also, the pre-acidification, degasification, and carbon removal will have additional beneficial effect. If, for example, there is any sulfur as sulfide in the water it will also be removed or precipitated along with dissolved iron and manganese compounds. Also, the water may be aerated to avoid the potential for formation of iron bacteria that is known to cause problems for downstream irrigation processes such as drip or sprinkler type irrigation.

Because only a small fraction of the calcium and sulfate may make its way into the concentrate stream, one can also operate the ED at very high water recovery and thus mitigate the disposal issues of concentrate. High water recovery is also made possible (in contrast to membrane processes such as RO and distillation) by operation of the ED apparatus such that dissolved silica (such as at pH lower than about 9.5) does not travel to the concentrating compartments, thus avoiding the potential for scaling by silica precipitation. Instead of such salinity being in the form of run off at high volumes resulting in a pollution problem, the salts (mostly sodium and chloride) can be concentrated and managed for proper disposal or further use as a source of salt, for solar pond energy generation, or use of the salt commercially or for production of chlorine or caustic.

Pre-treatment of raw water to be treated prior to introduction into to the ED system may also be important to maintain stable operation. Contaminants found in ground water such as iron (Fe) and manganese (Mn) may have a detrimental effect on the operation of ED by fouling the ion exchange membranes. Removal may comprise first acidification of the raw water with, for example, sulfuric acid and then using a forced draft degasifier as an example, which will aerate the raw water and cause Fe and Mn to oxidize and precipitate. Once precipitated, Fe and Mn can be removed with a sand filter. One example of a sand filter is the Vortisand® product manufactured by Evoqua Water Technologies LLC, Pittsburgh, Pa. An added benefit of aerating the raw water after acidification is that alkalinity will be removed since the acidification with convert alkalinity to carbon dioxide and thus will be sparged out of the raw water. This helps prevent calcium carbonate precipitation in ED equipment. Additionally, since most ground water contains little if any dissolved oxygen and is anaerobic by nature, aeration will have other benefits such as the removal of hydrogen sulfide and the suppression of sulfur utilizing bacteria that can cause corrosion of metal equipment in contact with the water.

The use of ED technology to produce water suitable for irrigation provides an advantage over other types of water purification equipment by its ability to selectively remove various ions from solution. For irrigation water, it is important to obtain a product water with a suitable sodium absorption ration (SAR). The equation for SAR is as follows:

$$SAR = \frac{[Na^+]}{\sqrt{\frac{1}{2}([Ca^{2+}] + [Mg^{2+}])}}$$

Thus, depending on the water chemistry, by using a monovalent selective ion exchange membrane it is possible to obtain a product water with a favorable SAR desired for irrigation. Monovalent selective membranes can be either cationic or anionic which means that, for example, a cation exchange monovalent selective membrane would preferably remove monovalent ions such as $Na^+$ and $K^+$ while removing a diminished fraction of $Ca^{2+}$ and $Mg^{2+}$. A monovalent anionic selective membrane would preferably remove $Cl^-$ and $HCO_3^-$ while removing a diminished fraction of $SO_4^{2-}$. In ED modules, four different combinations of ion exchange membranes can be used depending on the feed water chemistry. These combinations are:

Non-selective anion and cation membranes

Monovalent selective anion and non-selective cation membranes

Non-selective anion and monovalent selective cation membranes

Monovalent selective anion and cation membranes.

If multistage ED modules are used, different combination of ion exchange membranes can be used in each stage.

In many areas of saline or sodic soils, acids such as sulfuric acid are used to treat the soil due to the alkaline nature of the soil which is detrimental to various crops. Essentially, bulk sulfuric acid is sprayed onto fields periodically to treat the soil. Another favorable aspect of using ED to treat irrigation water is that the product water from the ED under certain operating conditions can be made acidic. These operating conditions may comprise applying a higher voltage than needed to cause water splitting (which primarily occurs at the anion membrane surface) which will reduce the pH in the product water.

In other implementations, depending on the choice of membrane materials and operating conditions, water splitting may preferentially occur on the cation exchange membranes. This may cause the pH in the product water exiting the diluting compartments to increase relative to pre-treated water fed into the diluting compartments and the pH of water passing through the concentrating compartments and/or interstitial water within the cation exchange membranes to decrease. These pH changes may be caused by hydrogen ions formed from the water splitting reaction entering or passing through the cation exchange membranes from the diluting compartment side and the concentration of hydroxide ions in the depleting compartments increasing.

The anion exchange membrane contains strong base ion exchange sites comprising a primary anionic ionogenic monomer, for example, one including a quaternary amine functional group. While under certain operating conditions, water will be split with such a membrane, it is possible to increase the tendency and amount of water splitting on the anion membrane, or reduce a voltage at which water splitting occurs, by also incorporating a compound having an additional functional group into the anion exchange membrane. One possible compound having an additional functional group that may facilitate water splitting on the membrane is dimethylethanolamine. This compound can be incorporated into the ion exchange membrane along with, for example, another compound having a tertiary amine functional group. Other anionic functional groups, for example, functional groups included in a polymer formed by polymerization of trimethylammoniumethylmethacrylic chloride crosslinked with ethyleneglycoldimethacrylate or a polymer formed by polymerization of trimethylammoniumethylmethacrylic chloride, vinylbenzyl trimethylammonium chloride and a neutral monomer (for example, hydroxyethylacrylate or hydroxymethacrylate) crosslinked with divinylbenzene. These functional groups may be incorporated into the ion exchange membrane by adding an additional monomer (or monomers) with the additional functional groups to the present monomer mixture which comprises a strong base functional monomer and a cross linking monomer. The additional functional groups may be added to nonselective and monovalent selective anion membranes. Thus, it would be possible to have, for example, a monovalent selective anion membrane which further comprises a secondary functional group to enhance water spitting. In this example, if $SO_4^{2-}$ ions are present, it is possible to generate sulfuric acid in-situ which would produce an acidic product water suitable for alkaline soils. Secondary functional monomers may be added to cation exchange membranes also such as monomers including weak acid functional groups.

In another aspect, selective ion exchangers may be used to remove undesirable ionic species such as boron either pre or post an electrodialysis apparatus.

In another aspect, the electrodialysis apparatus may be operated such that complex anions or cations may be generated at the polarized membrane surfaces of the cation or anion monovalent selective membrane respectively. For example, dissolved boron, as weakly ionized hydrated $H_3BO_3$ with a hydrogen dissociation constant somewhat greater than that of water, may be present in sodic waters at approximately 1 to 3 parts per million (ppm) as boron and in seawater at a concentration of approximately 3 to 5 ppm. For drinking water, it is preferable for boron concentration to be lower than 2 ppm, preferably lower than 1 ppm, and more preferably lower than 0.5 ppm. For use in crop irrigation, boron is often desired as a trace plant nutrient at levels of less than 1 ppm. However, at concentrations above 1 ppm, some crops are harmfully affected by excess boron. Previous methods to remove excess boron via membrane processes such as reverse osmosis, nanofiltration, or electrodialysis involve raising the pH of the water to a pH of 9.5 to 11 such that the boron ionization increases. Under such ionized conditions boron may be removed to acceptable levels.

In sodic waters, however, an objective is to decrease pH and thus further acidification steps would be necessary to further treat the water after such boron treatment and adding unwanted anions. In addition, if an objective is to maintain calcium and magnesium in the water, then raising the pH would render the water prone to scaling and harmful precipitation of calcium and/or magnesium hydroxides within the membrane apparatus. Aspects and embodiments disclosed herein can be configured and operated to avoid these difficulties by use of monovalent selective membranes.

The electrodialysis apparatus may be operated with an anode—cathode potential difference that causes a voltage to exist across the cation monovalent selective membranes below the active polarization voltage that results in splitting of water, but above the active polarization voltage where boron is dissociated from its hydrogen, or the active polarization voltage where selenium is dissociated from its hydrogen. The combination of the presence of relatively high levels of residual calcium and magnesium (which remains in the diluting stream), and lack of large amounts of monovalent ions such as sodium and potassium as the diluting stream is purified, provides for boron and selenium to be removed from the diluting stream. The resulting voltage gradient at the cation membrane surface will result in the local formation of boron complexes such as $CaH_2BO_3^+$ that are monovalent cations. Operation in this voltage range is possible due to the difference in dissociation constants of boron versus water. At standard conditions (1 atmosphere pressure, 25° C.) the first dissociation constant (pKa) for $H_3BO_3$ is 9.27 whereas the dissociation constant for water is 14. The boron complexes formed under polarizing conditions with respect to boron are capable of being removed by the monovalent selective cation membrane without excessively decreasing current efficiency for monovalent ion removal or raising the pH of the water in the diluting compartment being treated. At standard conditions the dissociation constant for $H_2SeO_3$ is 2.46. The selenium complexes formed under polarizing conditions with respect to selenium are capable of being removed by the monovalent selective anion membrane.

The relative active polarization voltages at which water dissociation and boron dissociation occurs may be calculated from the dissociation constants for $H_2O$ and $H_3BO_3$, respectively. The dissociation constant K for water dissociating to its ions is $10^{-14}$ (or K). Using the Nernst equation, the chemical potential $E=-0.0592 \log_{10} K$, or for water $E=0.829$. Since this is a positive number, it will take 0.829 volts to split water under standard conditions. Performing a similar calculation for the first ionization constant for aqueous boron: $H_3BO_3=H_2BO_3^-+H^+$, the dissociation constant is $5.4E^{-10}$. Plugging this in to the Nernst equation, $\log_{10}(5.4E^{-10})$ is $-9.268$ and so $E=0.549$. Since the voltage potential for the dissociation of boron is a lower positive number that the voltage potential for the dissociation of water, it only takes 0.549 volts to split boron to its first dissociation, which is less than that for water. Thus, dissociation of boron may occur at a lower voltage applied across the anode and cathode of an electrodialysis apparatus than water and boron dissociation may be performed without water dissociation. Similar calculations show that dissociation of selenium may occur at a lower voltage applied across the anode and cathode of an electrodialysis apparatus than water and selenium dissociation may be performed without water dissociation.

Further, if the electrodialysis apparatus is configured with an anion monovalent selective membrane and operated such that at the voltage level at or below the polarizing level of the cation membrane but above the polarizing water splitting level at the anion membrane, then the interstitial water in the anion membrane will operate at a local elevated pH and thus any boron compound near the anion membrane surface will be converted to the monovalent borate anion and further removed through the anion membrane while at the same time decreasing the pH of the bulk liquid in the diluting compartment. In combination, for example, it is possible to remove boron through both anion and cation membranes.

Analogously, brackish ground water may contain excessive levels of selenium in the form of mixtures of monovalent hydrogen selenite ($HSeO_3^-$) and hydrogen selenate ($HSeO_4^-$) and/or divalent selenite ($SeO_3^{2-}$) and selenate ($SeO_4^{2-}$). By use of monovalent selective anion membranes operating below the water splitting polarization current, monovalent hydrogen selenite and/or hydrogen selenate will be removed from the water to be treated by the monovalent anion selective membrane, and/or by operating at a polarizing current, selenite and/or selenate may be converted from a divalent ion to a hydrogen form monovalent ion and be removed through the monovalent selective anion membrane. This effect may also be utilized to remove divalent ions through monovalent selective anion membranes for ions such as sulfate and carbonate, if so desired. In implementation where removal of selenium would result in toxic conditions when the concentrating effluent from the ED apparatus is sent to evaporative ponds, elevated levels of selenium may be independently removed using processing steps such as chemical reducing agents (such as passing the water to be treated through a bed of zero valent iron), or by fixed film biological treatment.

In another aspect, a control in used to analyze the $Na^+$ content of the product water and adjust the operating voltage or current to maintain a specific SAR value in the product water.

In another aspect, the concentrate stream for the ED apparatus, considering that the concentrate effluent is high in monovalents and low in divalents, can be collected and used for fracking purposes. This would be especially attractive in arid areas and would offer synergy between agriculture and oil and gas water needs.

In another aspect, the concentrate stream of the ED apparatus is disposed or used to generate heat or electricity. The concentrate stream will contain a greater amount of ions compared to the raw water. This wastewater must be disposed of or otherwise used in some beneficial manner One possible disposal technique would be deep well injection. This technique is used today for flow back water from oil and gas extraction.

A solar pond operates by having the sun's rays contact the bottom of a shallow pool, which then heats the water adjacent to the bottom. When water at the bottom of the pool is heated, it becomes less dense than the cooler water above it, and convection begins. Solar ponds heat water by impeding this convection. Salt is added to the water until the lower layers of water become completely saturated. High-salinity water at the bottom of the pond does not mix readily with the low-salinity water above it, so when the bottom layer of water is heated, convection occurs separately in the bottom and top layers, with only mild mixing between the two. This greatly reduces heat loss, and allows for the high-salinity water to get up to 90° C. while maintaining 30° C. low-salinity water. This hot, salty water can then be pumped away for use in electricity generation, through a turbine or as a source of thermal energy. The use of a solar pond to treat the concentrate stream of an ED apparatus is particularly advantageous in arid areas where saline or sodic soils are often found.

In another embodiment, a water purification system utilizing an ED apparatus is used in conjunction with drip irrigation. Drip irrigation is the slow, precise application of water and nutrients directly to the plant root zone. Also known as micro or trickle irrigation systems, drip irrigation systems help maintain the ideal moisture level, encouraging the formation of deeper roots and more crops. Drip irrigation also saves water through reduced evaporation and runoff.

When using drip irrigation, it may be desirable to use a disinfectant to control the growth of biofilms and microorganisms. Potentially preferred disinfectants that could be used comprise chlorine dioxide and hypochlorite, for example, calcium hypochlorite since this will not add sodium to the soil. Such disinfectants may be produced electrochemically utilizing the compounds recovered from the feed water through the ED apparatus concentrating stream effluent.

In another embodiment, an in-line SAR monitor is utilized to measure the ionic compounds in water. This device comprises a micro ED cell with monovalent selective cation membranes to separate the feed water into an almost pure sodium chloride reject and a dilute containing the $Ca^{2+}$, $Mg^{2+}$, $SO_4^{2-}$ and the remaining NaCl. One may measure the conductivity of the feed, dilute and reject streams and estimate the $Na^+$ to $Ca^{2+}+Mg^{2+}$ ratio using equations derived in the lab from synthetic solutions and mass balance calculations.

In another embodiment, the electrical resistance of the soil is measured. Such a device for measuring the electrical resistance of soil may comprise a rod with electrodes wrapped around the rod at various depths. The rod with electrodes is inserted into the soil and the electrical resistance between the electrodes is measured, for example, at 1000 Hz. As the moisture content and chemistry change, it would be possible to increase the amount of water being used for irrigation or also to use water with varying amounts of calcium, magnesium, and sodium in order to change the SAR value near the root structure of the plant. As water is extracted by the plant's roots, salts are concentrated which will change the SAR value near the roots in addition to the salt concentration which could be detrimental to the plant.

In some embodiments, a method of providing water for irrigation use includes feeding pre-treated water to an electrodialysis device and applying a voltage across an anode and a cathode of the electrodialysis apparatus above an active polarization voltage at an anion selective membrane of the electrodialysis apparatus. The method may further include applying a voltage across an anode and a cathode of the electrodialysis apparatus above an active polarization voltage at a cation permeable membrane of the electrodialysis apparatus. The method may further include flowing the pre-treated water through diluting compartments of the electrodialysis apparatus at a flow rate sufficient to cause a pH of the treated water to be lower than a pH of the pre-treated water, and/or flowing the pre-treated water through the diluting compartments of the electrodialysis apparatus at a flow rate sufficient to cause a pH of interstitial water in the cation permeable membrane to have a lower pH with respect to the treated water.

The method may further include applying a voltage across an anode and a cathode of the electrodialysis apparatus at a selected active depleting stream voltage gradient, and/or operating the electrodialysis apparatus at a selected ion depleting membrane surface velocity, pH condition, temperature, polarization condition, and/or relative boundary layer concentration conditions of specific multivalent anions and/or cations relative to monovalent anions and/or cations such that anionic or cationic intermediates or ionic complexes are formed at the membrane surfaces either in connection with in-situ production of hydrogen or hydroxide ions or preferentially to any in-situ production of hydrogen or hydroxide ions, and/or operating the electrodialysis apparatus under conditions in which the anionic or cationic intermediates or complexes become relatively more permeable or less impermeable through either or both of the anionic or cationic selective membranes than these anions and/or cations or neutral constituents would be under equilibrium well-mixed conditions in the absence of an electric field.

Selectively removing one or both of the monovalent anionic and the monovalent cationic species from the pre-treated water may comprise removing a greater fraction of one or more of sodium ions, potassium ions, chloride ions, bicarbonate ions, nitrate ions, hydrogen selenate ions, hydrogen selenite ions or other monovalent ionic species from the pre-treated water relative to a fraction removal of multivalent ionic species. Retaining the one or both of the multivalent cationic and the multivalent anionic species in the pre-treated water may comprise retaining a greater fraction of one or more of magnesium ions, calcium ions, strontium ions, carbonate ions, selenate ions, selenite ions, sulfate ions, or other multivalent ionic species in the pre-treated water relative to a fraction removal of monovalent ionic species.

The method may further include operating the electrodialysis apparatus under conditions above an active polarization voltage in which hydrogen ions are produced at an anion selective membrane of a diluting compartment of the electrodialysis apparatus and/or in which hydroxide ions are produced at a cation selective membrane of a diluting compartment of the electrodialysis apparatus, and/or operating the electrodialysis apparatus under active polarization voltage conditions in which one or more of hydrogen sulfate, bicarbonate, borate, hydrogen selenate, or hydrogen selenite ions pass through the anion selective membrane into a concentrating compartment of the electrodialysis apparatus, and/or operating the electrodialysis apparatus under active polarization voltage conditions in which ionic complexes including one of calcium hydrogen boron ($CaH_2BO_3^+$) or magnesium hydrogen boron ($MgH_2BO_3^+$) pass through the cation selective membrane into a concentrating compartment of the electrodialysis system.

The method may further comprise applying a voltage across an anode and a cathode of the electrodialysis apparatus above an active polarization voltage at a cation permeable membrane of the electrodialysis apparatus. The method may further comprise flowing the pre-treated water through the diluting compartments of the electrodialysis apparatus at a flow rate sufficient to cause a pH of interstitial water in the cation permeable membrane to have a lower pH with respect to the treated water.

The method may further include producing the pre-treated water from untreated feed water by adding sulfuric acid or hydrochloric acid to the untreated feed water, producing the pre-treated water from untreated feed water by adding an oxidizing compound to one of the untreated feed water or to the pre-treated water, and/or removing dissolved gaseous components from the untreated feed water. Producing the pre-treated water from the untreated feed water may further comprise precipitating and filtering in-situ oxidizable compounds comprised of one or more of iron, manganese, sulfur, selenium, heavy metals, or other inorganic or organic materials from the untreated feed water, or creating in-situ oxidizing conditions within the untreated feed water by one or more of aerating the untreated feed water with oxygen-containing gas, use of oxidizing and disinfecting compounds including one or more of ozone, chlorine, or chlorine dioxide, or treatment via filtration through a media bed comprising an oxidizing media.

The method may further comprise adding one of sulfuric acid or hydrochloric acid to pre-treated water entering as feed water to the electrodialysis apparatus from a source external to the electrodialysis apparatus.

The method may further include generating one of oxidizing compounds or pH adjusting compounds using constituents of purified or speciated products of a concentrating stream of the electrodialysis apparatus as raw materials, and treating the one of oxidizing compounds or pH adjusting compounds in electrochemical oxidation/reduction apparatus to produce chemicals utilized by a pre-treatment system to produce the pre-treated water.

The method may further include monitoring a concentration of sodium in the treated water stream and adjusting an operating parameter of the electrodialysis device to maintain one of a desired SAR value or a concentration of a specific ionic or non-ionic constituent in the treated water stream and/or a concentrate water stream of the electrodialysis apparatus, and/or determining a SAR value of treated water in the treated water stream and adjusting one or both of an operating current of the electrodialysis device or a pH of feed water to the electrodialysis apparatus to maintain one or more of the desired SAR value or pH in the treated water stream and/or a concentrate water stream from the electrodialysis apparatus.

The method may further include utilizing a concentrate stream effluent produced in the electrodialysis device to produce reagents used as raw materials to condition and pre-treat untreated feed water to the electrodialysis apparatus.

The method may further include generating the heat or electricity from the concentrate stream includes directing the concentrate stream into a solar pond and optionally selectively causing evaporative processes to speciate purified solid chemical compounds for use in other commercial applications.

The method may further include producing reagents for further use from concentrate water from the electrodialysis apparatus using one or a combination of distillation, chromatographic ion retardation processes, crystallization, or selective evaporation.

A method of operating an electrodialysis apparatus may include feeding pre-treated water including less than 10 ppm or less than 5 ppm of elemental boron into a depleting compartment of the electrodialysis apparatus, maintaining a bulk pH of less than 9.5 or less than 8.5, for example, between 7 and 8.5 or between 6 and 7, within the depleting compartment of the electrodialysis apparatus, operating the electrodialysis apparatus under conditions in which at least 50% of the boron in the pre-treated water is removed from the depleting compartment, and discharging treated water from the depleting compartment of the electrodialysis apparatus, the treated water containing a concentration of elemental boron that is at least 50% less than the concentration of elemental boron in the pre-treated water.

Feeding the pre-treated water into the depleting compartment of the electrodialysis apparatus may comprise feeding the pre-treated water into an electrodialysis apparatus including a monovalent selective cation membrane.

An electrodialysis apparatus as disclosed herein may include a monovalent selective cation membrane or membranes. The electrodialysis apparatus may include controller configured to cause the electrodialysis apparatus to maintain a bulk pH of less than 9.5 or less than 8.5 or less than 7.5 or less than 6.5 within a depleting compartment of the electrodialysis apparatus, and to operate with a voltage across an anode and cathode of the electrodialysis apparatus and a flow rate of pre-treated water through the depleting compartment sufficient to remove at least 50% of boron from the pre-treated water flowed through the depleting compartment and having an elemental boron concentration of less than 10 ppm or less than 5 ppm when introduced into the depleting compartment.

An irrigation system as disclosed herein may include a sensor configured to measure a concentration of a specific ion, and a controller configured to adjust operating parameters of a pre-treatment system and/or an electrodialysis apparatus to control to the concentration of the specific ion in the treated water stream responsive to receiving a signal from the sensor indicative of the concentration of the specific ion.

One embodiment of an irrigation water system is indicated generally at 100 in FIG. 1. Untreated feed water from a source of untreated feed water 105, for example, a well, is optionally passed through a pre-filter 110, for example, a screen filter or sand filter to remove particulate matter. The pre-filtered water is provided via a valve 115 and a pump 120 to a pre-treatment system 125. The pre-treatment system 125 may include one or more unit operations to remove one or more undesirable components from the pre-filtered water or to alter one or more properties of the pre-filtered water or the concentration of one or more species in the pre-filtered water. The pre-treatment system 125 may include a forced draft degasifier 130 which may aerate the pre-filtered water with an oxygen containing gas, for example, air. The forced draft degasifier 130 may cause various contaminants in the pre-filtered water, for example, sulfur, iron, or manganese to oxidize and precipitate from the pre-filtered water. A source of pH adjustment agent 135, for example, a source of sulfuric acid (hydrochloric acid may also be used, but it would be preferable for certain implementations using monovalent selective anion membranes to utilize sulfuric acid so as to maintain or increase levels of sulfate relative to requiring the decrease of levels of added chloride), may dose the pre-filtered water as it passes through a conduit to the forced draft degasifier 130 with a pH adjustment agent, for example, sulfuric acid, to facilitate precipitation of contaminants from the pre-filtered water in the forced draft degasifier 130 and remove carbonate and bicarbonate as carbon dioxide gas formed by operating at a liquid pH between approximately 4.3 influent to 5.5 effluent. The pre-treatment system 125 may further include a particle filter 140, for example, a sand filter, to remove precipitated contaminants from the pre-filtered water. Other unit operations, for example, media, manganese greensand, carbon filters, heaters, coolers, or additional chemical (for example, chlorine, ozone, or chlorine dioxide) dosing systems to fine tune incoming pH to the electrodialysis apparatus may be included in embodiments of the pre-treatment system 125.

The pre-filtered water may exit the pre-treatment system 125 as pre-treated water at reduced pH and be introduced into a separation system 145. Separation system 145 may be utilized to remove undesirable components or ions from the pre-treated water while retaining desirable components or ions to produce treated water. The undesirable components or ions may include monovalent ions such as sodium or chloride. The desirable components or ions may include divalent or multivalent ions such as calcium and magnesium.

The separation system 145 may be or may include an electrically-driven separation system, for example, an electrodialysis (ED or EDR) system or an electrodeionization (EDI) system. In the particular embodiment illustrated in FIG. 1, the separation system 145 is an ED system. The pre-treated water may enter one or both of diluting compartment inlet(s) 155 and concentrating compartment inlet(s) 150 of the ED system 145. A pH adjustment agent, for example, sulfuric acid or hydrochloric acid from a second source of pH adjustment agent 160 may be added to the pre-treated water entering the concentrating compartment inlet(s) 150 of the ED system 145 to further acidify the pre-treated water passing into the concentrating compartments of the ED system 145 to prevent or reduce the likelihood or potential for deposition of scale, for example, calcium carbonate on membranes defining the concentrating compartments of the ED system 145. This reduced likelihood of scale, particularly when used in conjunction with monovalent selective membranes in the ED apparatus, allow for operation at higher water recoveries of purified water, and higher levels of salinity in the concentrated stream 180. The effluent concentrated stream 180 may then be sent for further processing such as to a solar pond for energy capture, for use as a raw material for electrochemical production of disinfectant compounds such as chlorine or chlorine dioxide, for use in the electrochemical manufacture of hydrochloric acid or caustic, for use as water for oil and gas production, or to evaporative or chromatographic speciation processes for production of purified salts. Additionally or alternatively, a pH adjustment agent, for example, sulfuric acid from the second source of pH adjustment agent 160 may be added to the pre-treated water entering the diluting compartment inlet(s) 155 of the ED system 145 to further acidify the pre-treated water passing into the diluting compartments of the ED system 145.

The ED apparatus may be operated in polarity reversal mode as protection against scaling of any residual carbonate or sulfate scale, but in systems operating with an ED apparatus comprising monovalent selective membranes, with carbonate removal in the pre-treatment system, and with reduced pH in the feed water and reduced divalent concentrations in the concentrate water, it may be preferable to operate without polarity reversal because the potential for scaling is greatly reduced. Generally, systems not using polarity reversal are less costly and require fewer internal control systems, fewer valves, less expensive electrodes, and provide a higher yield of purified water.

Figure 2A:
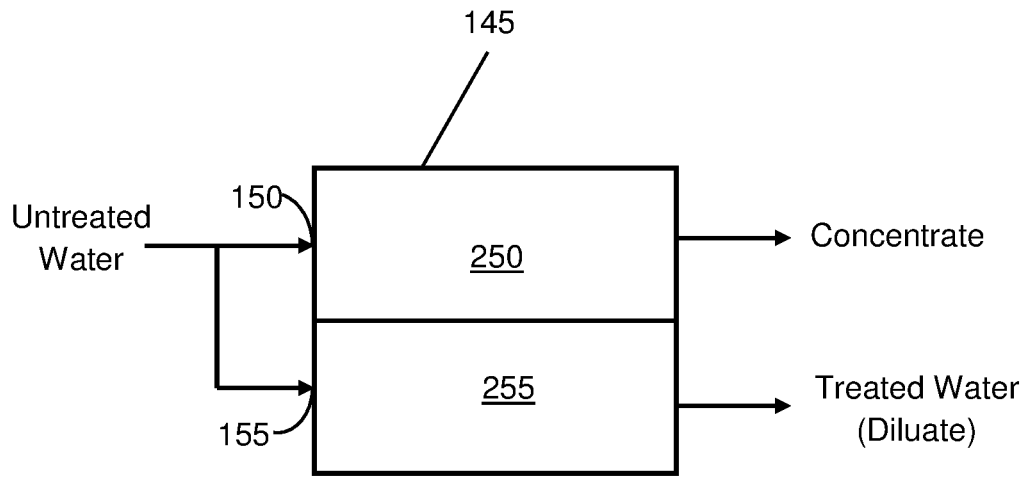
FIG. 2A is a schematic illustration of an electrodialysis device operating in a single stage once-through configuration.
Figure 2B:
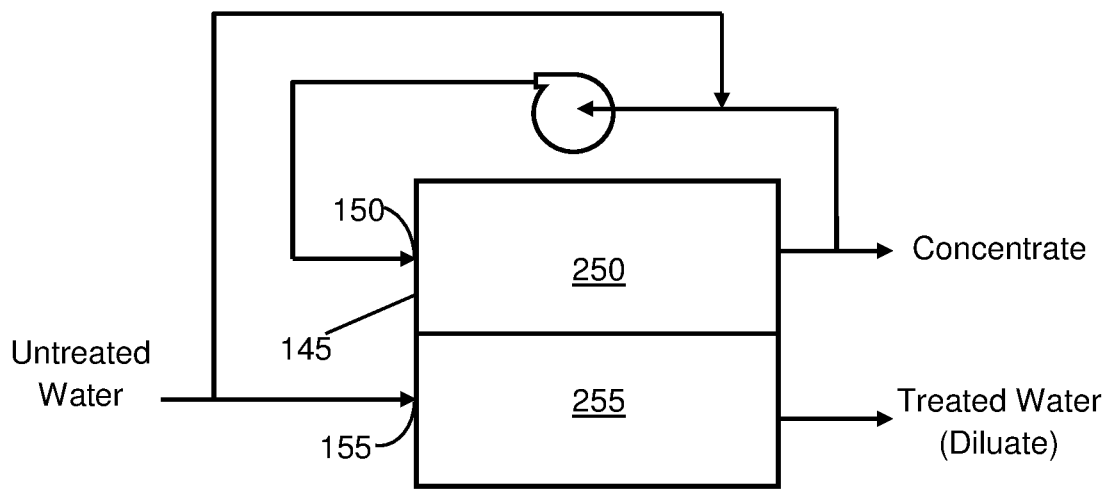
FIG. 2B is a schematic illustration of an electrodialysis device operating in a single stage configuration with concentrate recirculation.

As illustrated in FIG. 2A, the ED system 145 may be operated in a once through configuration in which the pre-treated water passes though both the concentrating compartments of the ED system 145, illustrated collectively at 250, and the diluting compartments of the ED system 145, illustrated collectively at 255, only once to produce a treated water stream and a concentrate stream. In other embodiments, for example, as illustrated in FIG. 2B, the pre-treated water passes through the diluting compartments 255 of the ED system 145 only once to produce a treated water stream, but the concentrate produced in the concentrating compartments 250 is recirculated through the concentrating compartments 250. Illustrated is the use of additional pre-treated water added to the concentrating compartments 250 to maintain one or more desired properties of the concentrate stream. However, in an alternate operating mode (not shown), some of the treated diluting stream water may be treated by a further membrane process such as by nanofiltration wherein a fraction of the permeate from the nanofiltration system may be recycled as makeup to the concentrating stream as makeup such that the concentration of divalent ions in the concentrate stream is minimized.

Figure 3:
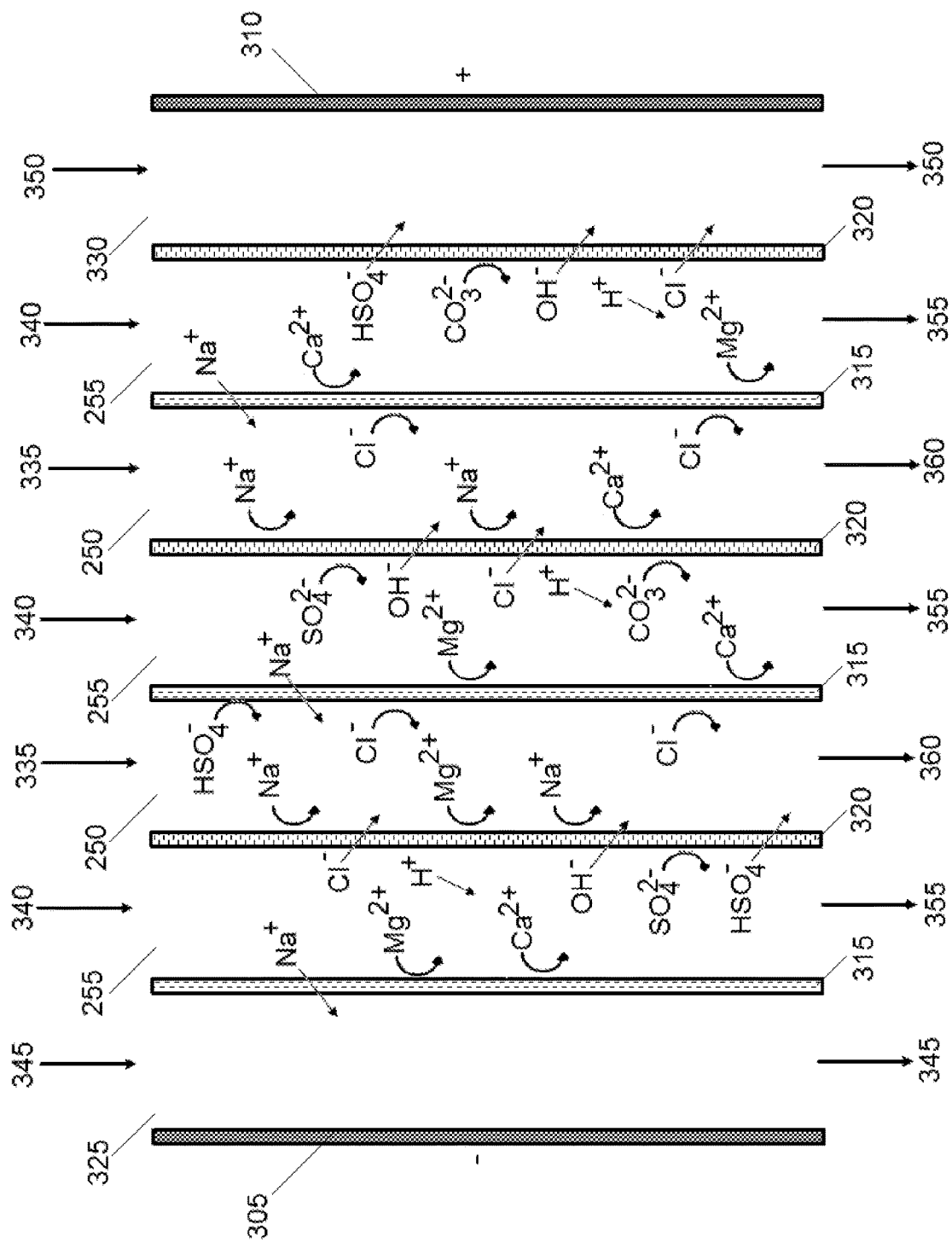
FIG. 3 is a schematic representation of a portion of an electrodialysis device which can be utilized in one or more embodiments disclosed herein.

Details of the concentrating compartments 250 and the diluting compartments 255 of embodiments of the ED system 145 are illustrated in FIG. 3. The ED system includes an anode 310 and a cathode 305. Disposed between the anode 310 and the cathode 305 are a plurality of concentrating compartments 250 and diluting compartments 255. The concentrating compartments 250 and diluting compartments 255 are separated by cation selective membranes 315 and anion selective membranes 320 which define the boundaries of the concentrating compartments 250 and diluting compartments 255. One or more of the cation selective membranes 315 and anion selective membranes 320 may be monovalent selective membranes that selectively pass monovalent ions while preventing the passage of divalent or otherwise multivalent ions, or at least passing divalent or otherwise multivalent ions to a lesser degree than monovalent ions. A cathode compartment 325 is defined between the cathode 305 and one of the cation selective membranes 315. An anode compartment 330 is defined between the anode 310 and one of the anion selective membranes 320. Feed water 335 is introduced into the concentrating compartments 250 and feed water 340 is introduced into the diluting compartments 255. The feed water 335, 340 may be the pre-treated water from the pre-treatment system 125 of FIG. 1 or may be water that has been recirculated from an outlet of the ED system 145 as illustrated in FIG. 2B. Feed waters 335, 340 may be from the same source or from different sources and may have the same compositions or different compositions. Cathode rinse water 345 is introduced into the cathode compartment 325 and anode rinse water 350 is introduced into the anode compartment 330. In some embodiments the cathode rinse water 345 and/or anode rinse water 350 may be one of feed waters 335, 340 or a combination of feed waters 335, 340.

In operation, power from a power supply (not shown) provides electrical energy for an electrical field created across the ED system 145 through the cathode 305 and anode 310. Ions present in the feed water 335, 340 may migrate toward the one of the cathode 305 or the anode 310 having an opposite charge to the ions under the influence of the generated electric field. For example, sodium ions ($Na^+$) present in the feed water 335, 340 may migrate toward the cathode 305 while chloride ions (co present in the feed water 335, 340 may migrate toward the anode 310. The sodium ions may be substantially prevented from migrating across the anion selective membranes 320. The chloride ions may be substantially prevented from migrating across the cation selective membranes 315. The concentration of sodium ions and chloride ions may thus increase in the concentrating compartments 250 and may decrease in the diluting compartments 255. Multivalent anions, for example, sulfate ($SO_4^{2-}$) or carbonate ($CO_3^{2-}$) may be may be substantially prevented from migrating across the cation selective membranes 315 and may be substantially prevented from migrating across the anion selective membranes 320 if the anion selective membranes are monovalent ion selective membranes. Multivalent cations, for example, magnesium ($Mg^{2+}$) or calcium ($Ca^{2+}$) may be may be substantially prevented from migrating across the anion selective membranes 320 and may be substantially prevented from migrating across the cation selective membranes 315 if the cation selective membranes are monovalent ion selective membranes. The sulfate and carbonate ions may be retained in the diluting compartments 255. Retention of the carbonate ions in the diluting compartments 255 may prevent the carbonate ions from forming scale on the membranes in the concentrating compartments 250. Hydrogen sulfate ($HSO_4^-$) ions may pass through the anion selective membranes 320 but not the cation selective membranes 315. The passage of the hydrogen sulfate into the concentrating compartments 250 may decrease the pH of water in the concentrating compartments 250 and help reduce the potential for scaling of the membranes bordering the concentrating compartments 250.

When sufficient voltage is applied across the cathode 305 and anode 310, water splitting ($H_2O \rightarrow H^+ + OH^-$) may occur, typically at the anion selective membranes 320. The hydroxide ions may migrate across the anion selective membranes 310 into the concentrating compartments 250 and increase the pH in the concentrating compartments 250. Fluid flow through the diluting compartments 255 may be sufficiently fast that the hydrogen ions generated by the water splitting reaction do not have time to migrate across the diluting compartments 255 to the cation selective membranes 315 and thus remain in the diluting compartments 255 and reduce the pH of the water in the diluting compartments 255.

Product water or treated water 355 (diluate) exiting the diluting compartments 255 will have a reduced concentration of monovalent ions to multivalent ions than the influent feed water 340 and thus a lower SAR value than the influent feed water. Concentrate 360 exiting the concentrating compartments 250 will have a higher concentration of monovalent ions to multivalent ions than the influent feed water 335 and thus a higher SAR value than the influent feed water 335 or the treated water 355. Cathode rinse water 345 having passed through the cathode compartment 325 and anode rinse water 350 having passed through the anode compartment 330 may be combined with the concentrate 360.

It should be appreciated that embodiments of ED systems disclosed herein may include a significantly greater number of diluting and concentrating compartments and associated anion permeable membranes and cation permeable membranes that illustrated in FIG. 3. It should also be appreciated that embodiments of ED systems disclosed herein may include multiple stages of diluting and concentrating compartments and associated anion permeable membranes and cation permeable membranes. Embodiments of ED systems disclosed herein are not limited to any particular number of stages of number of diluting and concentrating compartments per stage.

Returning to FIG. 1, diluate may exit the diluting compartments of the ED system 145 as treated water through a treated water outlet 165 of the ED system 145. The treated water may be introduced into an irrigation water distribution system (e.g., a conduit fluidly connected to the treated water outlet 165 of the ED system 145) and utilized as irrigation water for crops 170. Concentrate may exit the concentrating compartments of the ED system 145 though a concentrate outlet 175. The concentrate from the ED system 145 may be sent to an ancillary point of use 180. In the ancillary point of use 180, the concentrate may be used to produce heat or energy, for example, in a solar pond. The concentrate may, in some embodiments be further treated, for example, in a solar still, to produce additional purified water and reduce the volume of concentrate for disposal. In some embodiments the concentrate may be further treated to recover economically valuable salts. The concentrate may also or alternatively be used for deep well injection, fracking, or other purposes.

The irrigation system 100 may include a number of sensors at various locations. The irrigation system 100 may include, for example, a sensor 175 located in the pre-treatment system 125 between the forced draft degasifier 130 and the particle filter 140. Sensor 175 may be, for example, one or more of a flow meter, a pH sensor, or a sensor configured to monitor one or more other properties of the water in the pre-treatment system. Sensor 175 may provide data regarding one or more parameters of the water in the pre-treatment system to a controller 195 of the irrigation system 100, which may utilize the received data to control operation of one or more of the valve 115, pump 120, source of pH adjustment agent 135, forced draft degasifier 130, or the particle filter 140. Signal lines for providing communication between the controller 195 and the various components of the system 100 are illustrates as dashed lines in FIG. 1.

In one example, if the sensor 175 provides an indication to the controller 195 of the pH of the water passing through the pre-treatment system 125 being outside of a desired range of between pH of 5 and 8, the controller 195 may adjust a volume or rate of addition of pH adjustment agent from the source of pH adjustment agent 135 into the untreated feed (optionally pre-filtered) water. Optionally, (not shown) the pH adjusting agent may be synthesized by electrochemical treatment of the concentrating stream effluent. The controller 195 may be implemented as a computerized controller either local to the irrigation system 100 or remote from the irrigation system 100.

One or more additional sensors 185 may be provided to monitor one or more properties of the treated water from the ED system 145. The one or more properties may include any one or more of pH, temperature, conductivity, SAR value, selective ion concentration, or any other property of interest. The one or more additional sensors 185 may provide an indication of a measured property to the controller 195, which may adjust one or more operating parameters of any one of the valve 115, pump 120, source of pH adjustment agent 135, forced draft degasifier 130, particle filter 140, ED system 145, or source of pH adjustment agent 160 to bring the measured property of the treated water into a desired range of between 5 and 8.

In some embodiments, the irrigation system 100 may include one or more sensors 190 to measure one or more properties of the soil at the site at which the treated water is supplied as irrigation water. The one or more sensors 190 may include, for example, one or more of a pH sensor or a conductivity sensor. The one or more sensors 190 may provide an indication of the one or more properties of the soil to the controller 195, which may adjust one or more operating parameters of the irrigation system 100, for example, to adjust a flow rate of irrigation water or a rate of addition of pH adjustment agent to the untreated feed water based on the measured pH or conductivity of the soil.

It should be appreciated that FIG. 1 is highly schematic and that embodiments of the irrigation system 100 may include additional components or unit operations, for example, additional valves, pumps, chemical dosing systems, pressure-driven or electrically-driven separation systems, sample ports, sensors, or other features useful for facilitating operation of the irrigation system 100.

In some embodiments the SAR value achievable in treated water 355 exiting the diluting compartments 255 of an ED system 145 may be at least partially dependent upon the selectivity of the membranes utilized in the ED system 145. Selectivity to transport of monovalent ions (for example, sodium) to divalent ions (for example, magnesium and calcium) through a membrane may be defined by the following equation:

$$\text{Selectivity} = \frac{\left[\frac{\Delta C_{Na}}{C_{Na}}\right]}{2\left[\frac{\Delta C_{Ca} + \Delta C_{Mg}}{C_{Ca} + C_{Mg}}\right]}$$

Figure 4:
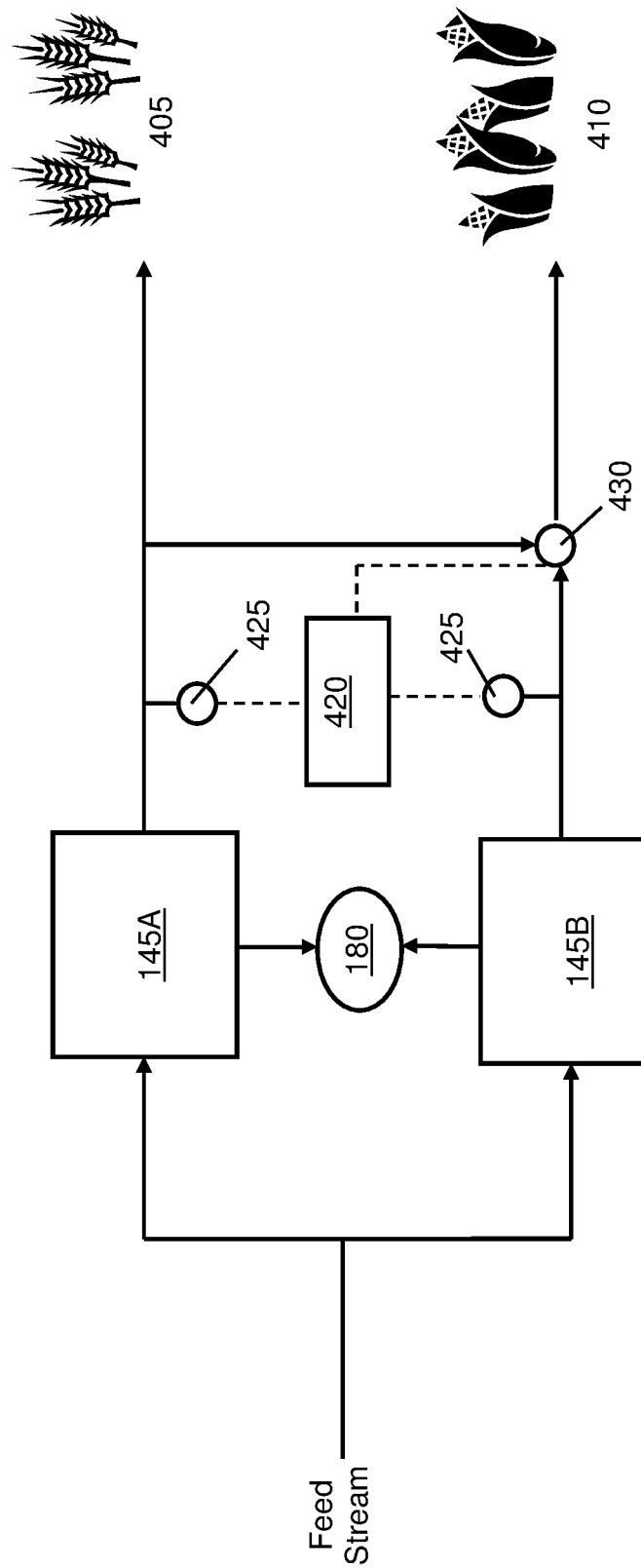
FIG. 4 is a schematic illustration of a portion of an embodiment of an irrigation water production and delivery system including electrodialysis systems operated in parallel.

Where: $C_i$=molarity of ionic species I (mol/l)
$\Delta C_i$=change in the molarity of ionic species i in the ED process In some embodiments, irrigation water having different SAR values may be desired, for example, in locations where crops having different SAR tolerances are grown in proximity to one another. A single ED system having highly selective membranes and capable of producing irrigation water with a low SAR value may be used to supply all irrigation water in such embodiments, however, ED systems having less selective membranes may be less costly. It may thus be beneficial to operate two or more ED systems 145A, 145B capable of producing irrigation water with different SAR values in parallel and mixing the treated waters from the two or more ED systems 145A, 145B in desired ratios to satisfy the needs of different crops 405, 410 as illustrated in FIG. 4. A controller 420 (which may be the same or different from controller 195 in FIG. 1) and associated sensors 425 may measure the sodium concentration or other indication of SAR of the treated water from the two or more ED systems 145A, 145B and adjust mixing valves, for example, mixer or flow controller 430, for combining the treated water from the two or more ED systems 145A, 145B in desired ratios to satisfy the needs of the different crops 405, 410. Concentrate streams from the two or more ED systems 145A, 145B may be combined and sent to an ancillary point of use 180. Alternatively, some of the treated water, particularly any dilute stream outlet water product from an electrodialysis apparatus configured with monovalent anion and/or monovalent cation membranes, may be further treated using a membrane process such as nanofiltration (not shown). Such electrodialysis apparatus dilute stream outlet water will be depleted of monovalent ions while maintaining robust levels of multivalent ions. Such a feed water composition is ideal for efficient and low energy removal of salts using nanofiltration and may also result in additional removal of remaining constituents such as trace levels of boron. As a result, the retentate from the nanofilter will remain useful for irrigation water, with a further decrease in SAR value, whereas the permeate from the nanofilter will be ideal for applications such as for potable water, washing, or water for livestock.

Example 1

To determine the viability of utilizing an electrodialysis device to produce water suitable for irrigation from well water, the following testing was performed; Samples were taken from well water in Texas. The concentration of various ions and the pH of the well water sample were measured to be as indicated below in Table 1:

TABLE 1

| Well Water Properties | | | |
|---|---|---|---|
| | Average of grab samples during 2014-2015 | | |
| Well no. | 1 | 2 | 3 |
| Ca | 182.5 | 110.1 | 43.6 |
| Mg | 69.9 | 33.9 | 22.2 |
| Na | 635.2 | 1274.8 | 1455.9 |
| K | 31.4 | 98.6 | 71.8 |
| $NH_4$ | 40.2 | 44.1 | 1316.7 |
| $SO_4$ | 927.1 | 421.0 | 0.0 |
| $CO_3$ | NA | NA | NA |
| $HCO_3$ | NA | NA | NA |
| Cl | 785.4 | 1531.2 | 1064.3 |
| F | 4.4 | 3.1 | 3.7 |
| $NO_3$ | 13.0 | 11.7 | 0.0 |
| $PO_4$ | 0.0 | 0.0 | 0.0 |
| B | NA | NA | NA |
| $SiO_2$ | NA | NA | NA |
| pH | 7.8 | 8 | 7.9 |

NA = not available

A model was used to simulate treatment of the different well water samples using a NEXED® electrodialysis device, available from Evoqua Water Technologies LLC, operated with three passes (16 sub-blocks arranged in 6-6-4 configuration) and having monovalent selective cation exchange membranes.

Results of the simulation for the NEXED® electrodialysis device operated with concentrate recirculation to achieve 90% water recovery are illustrated in Table 2 below:

TABLE 2

| Simulation Results for 90% Water Recovery | | | |
|---|---|---|---|
| Well no. | 1 | 2 | 3 |
| Feed TDS (ppm) | 2689 | 3529 | 4082 |
| Product TDS (ppm) | 998 | 1473 | 1813 |
| Concentrate TDS (ppm) | 17506 | 21583 | 23468 |
| Feed SAR | 10.4 | 28.5 | 46.1 |
| Product SAR | 4.8 | 14.3 | 25.0 |
| Concentrate SAR | 34.7 | 90.3 | 141.3 |
| NEXED module configuration | 6-6-4 | 6-6-4 | 6-6-4 |
| Product flow rate ($m^3$/hr) | 15.0 | 15.0 | 15.0 |
| Product flow rate (gpm) | 66.0 | 66.0 | 66.0 |
| Water recovery | 90.0% | 90.0% | 90.0% |
| Concentrate recirculation | Yes | Yes | Yes |
| Energy consumption (KWh/$m^3$) | 0.54 | 0.80 | 0.88 |
| Energy consumption (KWh/kgal) | 2.06 | 3.03 | 3.33 |

Results of the simulation for the NEXED® electrodialysis device operated without concentrate recirculation to achieve 50% water recovery and with concentrate recirculation to achieve 90% or 75% water recovery are illustrated in Table 3 below:

TABLE 3

| Simulation Results for Different Water Recoveries | | | |
|---|---|---|---|
| Recovery | 50% | 90% | 75% |
| Feed TDS (ppm) | 2689 | 2689 | 2689 |
| Product TDS (ppm) | 827 | 866 | 998 |
| Concentrate TDS (ppm) | 5381 | 7998 | 17506 |
| Feed SAR | 10.4 | 10.4 | 10.4 |
| Product SAR | 3.8 | 4.6 | 4.0 |
| Concentrate SAR | 17.1 | 34.7 | 22.0 |
| NEXED module configuration | 6-6-4 | 6-6-4 | 6-6-4 |
| Product flow rate ($m^3$/hr) | 15.0 | 15.0 | 15.0 |
| Product flow rate (gpm) | 66.0 | 66.0 | 66.0 |
| Concentrate recirculation | No | Yes | Yes |
| Energy consumption (KWh/$m^3$) | 0.46 | 0.54 | 0.52 |
| Energy consumption (KWh/kgal) | 1.74 | 2.06 | 1.97 |

These results illustrate that electrodialysis is a viable process for producing product water suitable for irrigation of sensitive crops from moderately saline ground water. An electrodialysis device may be capable of reducing the SAR of influent water by about 50% or more with 90% water recovery.

Example 2

Figure 5:
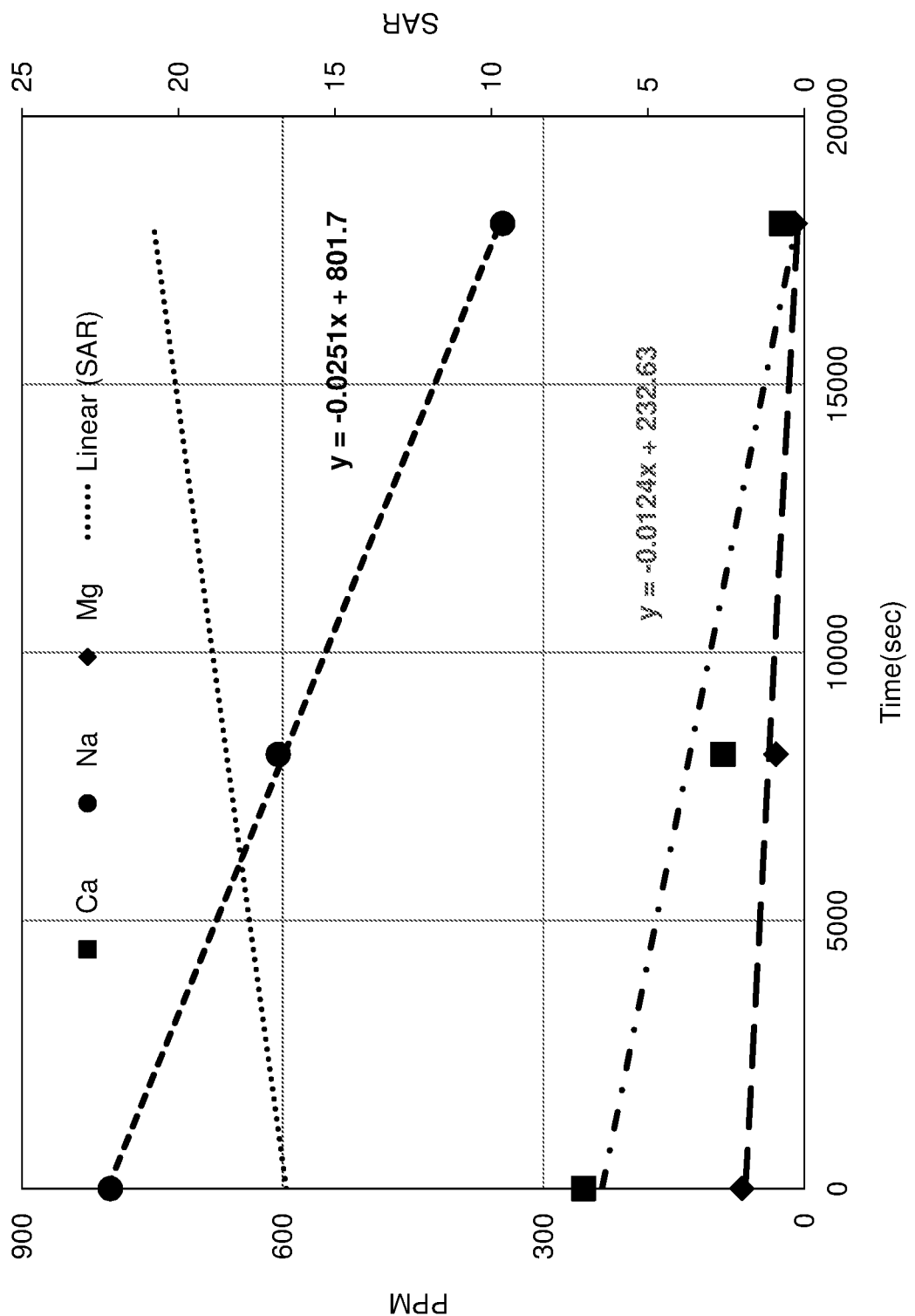
FIG. 5 is a graph showing typical calcium, magnesium, and sodium removal over time in a batch operational test using an electrodialysis apparatus comprising a cation exchange membrane that is not monovalent selective.

To determine the effectiveness of cation permeable membranes for separating cationic species from anionic species in an electrochemical cell, the following testing was performed: An ion transfer apparatus including an anode, a cathode, and a single cation selective membrane was built. Simulated feed water including about 800 ppm $Na^+$, about 250 ppm $Ca^{2+}$, and about 80 ppm $Mg^{2+}$ was prepared. FIG. 5 provides a control example of expected desalination performance with respect to cations from an electrodialysis apparatus with lack of SAR improvement. The ion transfer apparatus operated in a batch mode with limited time operation so as to minimize shifts in pH. FIG. 5 provides operational data over time from 0 to 18000 seconds of operation. The cation membrane used in this example was not monovalent selective. As can be seen, initial levels of sodium, calcium, and magnesium on the anode side of the cation membrane were approximately 800 ppm, 250 ppm, and 80 ppm respectively. Final levels of sodium, calcium, and magnesium were approximately 350 ppm, 10 ppm, and 10 ppm respectively. Based on these values, despite that the overall diluting stream salinity declined by nearly 70%, due to high transfer of divalent ions the SAR value increased from approximately 17 to approximately 21. This same effect may be found when such typical brackish water types are treated using other standard membrane process such as RO or nanofiltration.

Example 3

Figure 6:
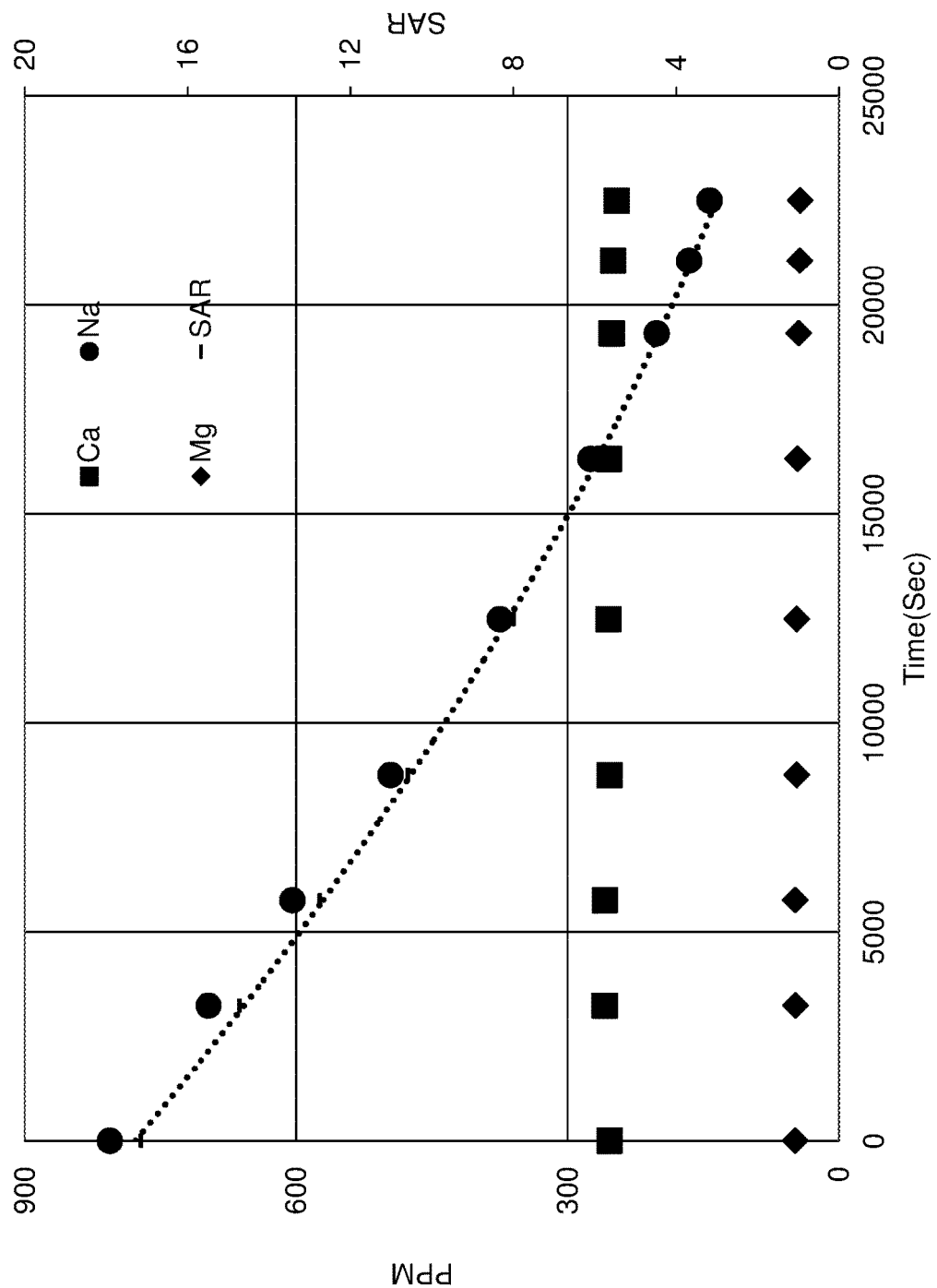
FIG. 6 is a graph showing typical calcium, magnesium and sodium removal over time in a batch operational test using an electrodialysis apparatus comprising a cation exchange membrane that is monovalent selective.

To determine the effectiveness of monovalent selective cation permeable membranes for separating cationic species from anionic species in an electrochemical cell, the following testing was performed: An ion transfer apparatus including an anode, a cathode, and a single cation selective membrane was built. Simulated feed water including about 800 ppm $Na^+$, about 250 ppm $Ca^{2+}$, and about 80 ppm $Mg^{2+}$ was prepared. FIG. 6 provides an example of expected desalination performance with respect to cations from an electrodialysis apparatus disclosed herein with SAR improvement. The ion transfer apparatus operated in a batch mode with limited time operation so as to minimize substantial shifts in pH. The figure provides operational data over time from 0 to 23000 seconds of operation. The cation membrane used in this example was monovalent selective. As can be seen, initial levels of sodium, calcium, and magnesium on the anode side of the cation membrane were approximately 800 ppm, 250 ppm, and 80 ppm respectively. Final levels of sodium, calcium, and magnesium were approximately 150 ppm, 250 ppm, and 80 ppm respectively. Based on these values, the overall diluting stream salinity declined by approximately 60% with little or no removal of divalent ions. Due to low transfer of divalent ions, the SAR value declined from approximately 18 to approximately 3.

Example 4

Figure 7:
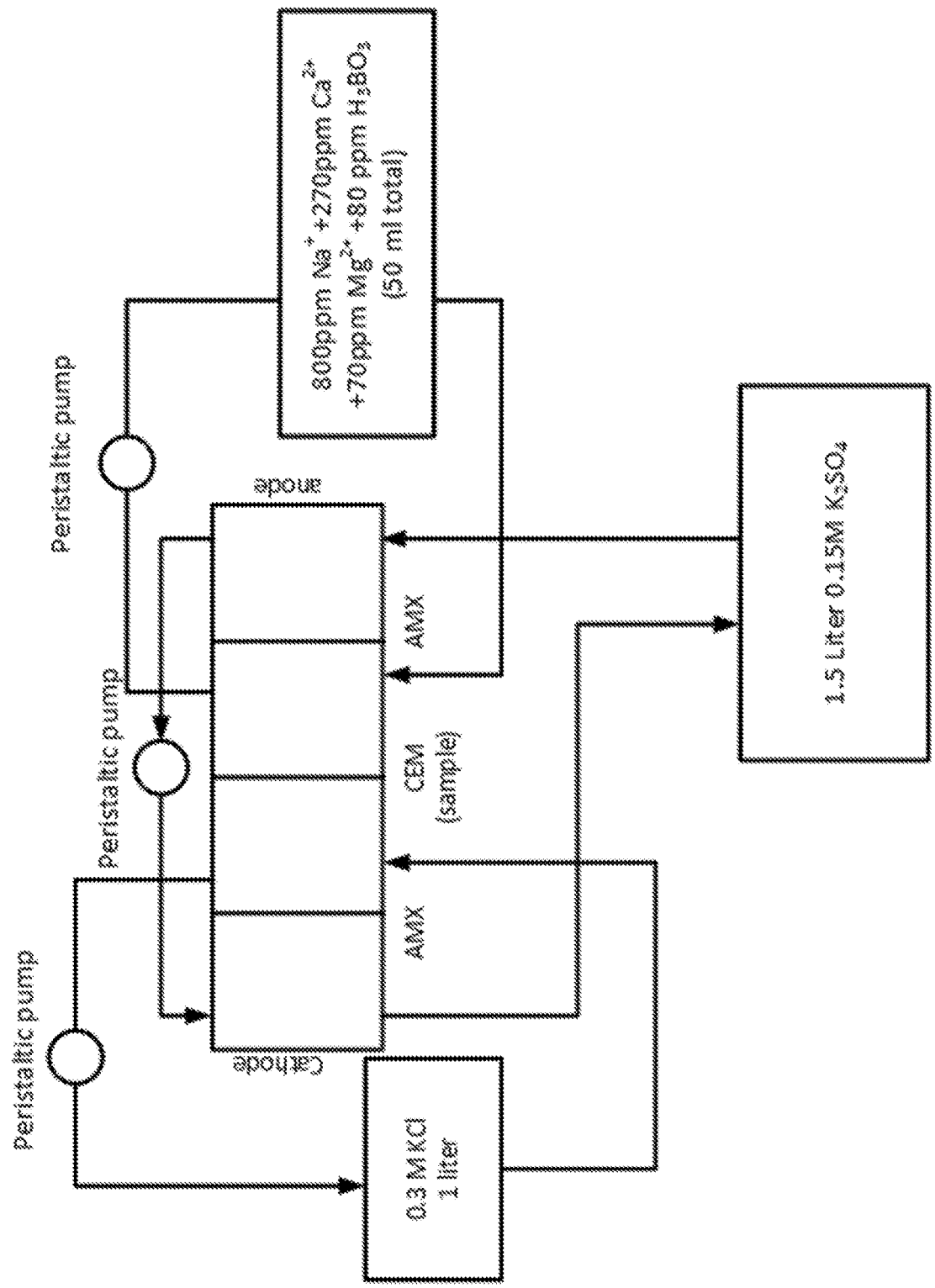
FIG. 7 is a graph showing typical calcium, magnesium and sodium and boron removal over time in a batch operational test using an electrodialysis apparatus comprising a cation exchange membrane that is monovalent selective.

To determine the effectiveness of monovalent selective cation permeable membranes for separating boron in an electrochemical cell, the following testing was performed: An ion transfer apparatus including an anode, a cathode, a single monovalent cation selective membrane, and anion selective membranes on either side of the cation selective membrane was built. The apparatus is schematically illustrated in FIG. 7. As shown in FIG. 7, the ion transfer apparatus is a mini-ED device containing cathodic, anodic, concentrate, and dilute compartments. The membranes used have a circular shape with an active area for ion transport of 7.0 $cm^2$. A cation exchange membrane is placed in the middle and is "sandwiched" by two anion exchange membranes. The two electrode compartments were pumped by a peristaltic pump in series using 0.15 M $K_2SO_4$ solution from a reservoir containing 1.5 liter of such solution. The pumping rate is ~200 ml/min. All the four compartments have a width of 2 cm and cross-sections shaped as 7 $cm^2$ area circles. The concentrate stream was 0.3 M KCl circulated by a peristaltic pump at a flow rate of 200 ml/min. The dilute stream contains total ~70 ml solution (including in the line) and was pumped at 200 ml/min. The current density was 25 $A/m^2$. The system operated at room temperature and the water being treated had a pH of 6.1.

The $K^+$ concentration in the dilute compartment was measured to understand the current "inefficiency". Less than 1% of K was present in the dilute compartment as measured by ion chromatography (IC). This indicated that a 99% current efficiency was achieved due to the degree of membrane selectivity.

The sample in the dilute compartment was periodically sampled for IC and boron analysis. The IC test was performed with a 0.250 ml sample that was diluted 400 times with DI water and injected into the IC device. Meanwhile a 1.00 ml sample was used to analyze boron concentration using Hach's BoroVer agent for optical adsorption at 600 nm.

Figure 8:
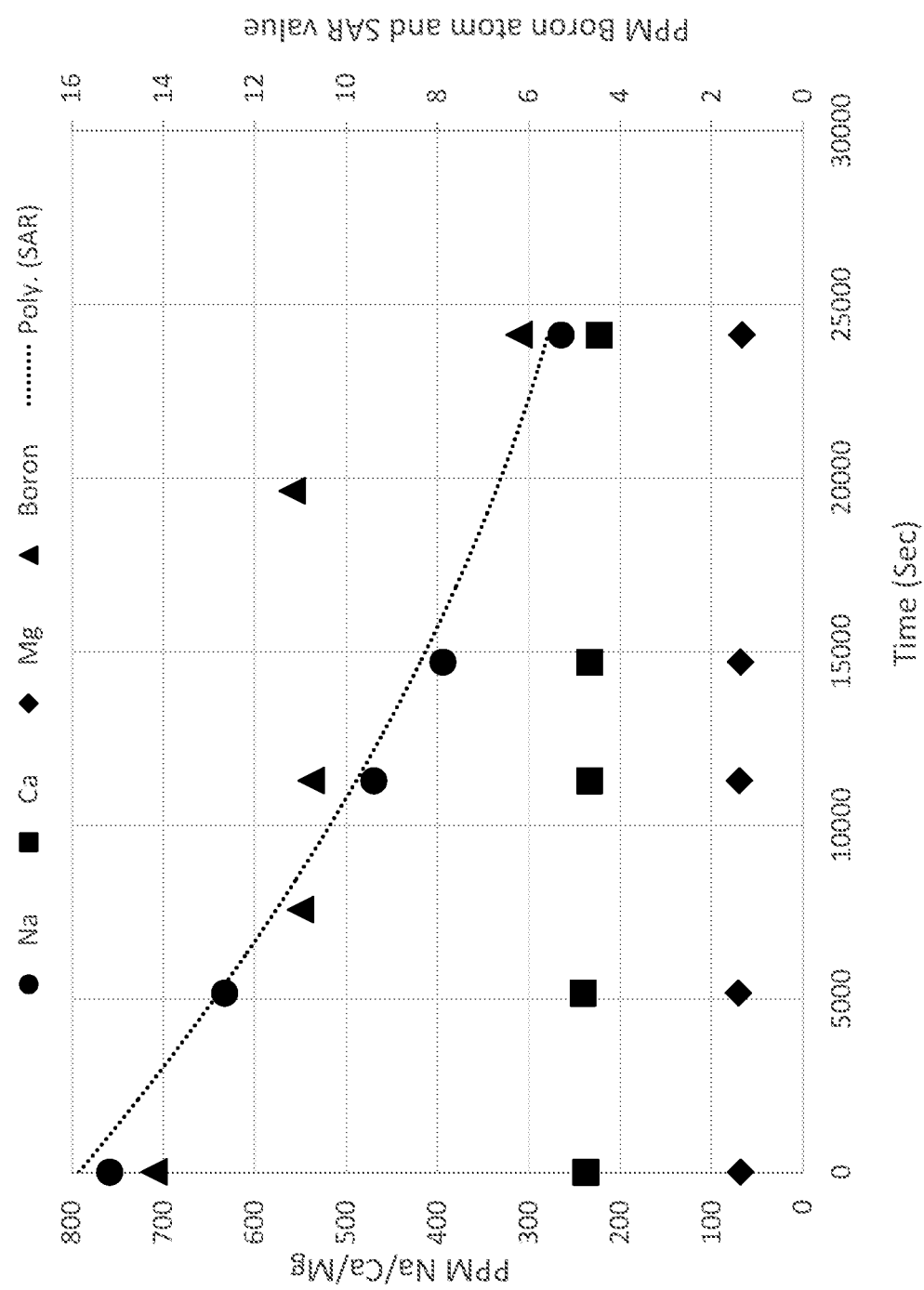

FIG. 8 is the experiment data showing the concentration of the three ions as the desalting progressed over time from 0 to 23000 seconds of operation. It was found the boron concentration starts to drop as the $Na^+$ concentration become less dominant on charge transport through the cation membrane. As can be seen, initial levels of sodium, calcium, magnesium, and boron on the anode side of the cation membrane were approximately 780 ppm, 250 ppm, 80 ppm, and 14 ppm respectively. Final levels of sodium, calcium, and magnesium were approximately 280 ppm, 250 ppm, and 80 ppm respectively. Based on these values, the overall diluting stream salinity declined by approximately 55% with little or no removal of divalent ions. Due to low transfer of divalent ions, the SAR value declined from approximately 16 to approximately 5. Boron levels showed an initial decline from approximately 14 ppm to approximately 11 ppm remained at 11 ppm until the sodium level declined to a level approaching the combined level of remaining calcium and magnesium. At that point, the boron level declined to less than 7 ppm. Over 50% boron removal was attained without requiring an increase in diluting stream pH.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. For example, features of any one or more embodiments disclosed herein may be combined with features of any other embodiments disclosed herein. Accordingly, the foregoing description and drawings are by way of example only.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of providing water suitable for irrigation use, the method comprising:
producing pre-treated water from untreated feed water by adding an oxidizing compound to the untreated feed water or to the pre-treated water and precipitating and filtering in-situ oxidizable compounds comprised of one or more of iron, manganese, sulfur, selenium, heavy metals, and other inorganic or organic materials from the untreated feed water;
feeding the pre-treated water to an electrodialysis apparatus;
treating the pre-treated water in the electrodialysis apparatus by selectively removing a fraction of either one or both of monovalent anionic and monovalent cationic species from the pre-treated water while preferentially retaining either one or both of multivalent anionic and multivalent cationic species to produce a treated water stream having a lower ratio of monovalent ions to multivalent ions than the pre-treated water; and
directing the treated water into an irrigation water distribution system.

2. The method of claim 1, further comprising producing treated water having a lower sodium absorption ratio (SAR) value than the pre-treated water and a concentrated water stream having a higher SAR value than the pre-treated water.

3. The method of claim 2, further comprising producing treated water having a SAR value below 20.

4. The method of claim 1, further comprising applying a voltage across an anode and a cathode of the electrodialysis apparatus above an active polarization voltage at an anion selective membrane of the electrodialysis apparatus.

5. The method of claim 4, further comprising flowing the pre-treated water through diluting compartments of the electrodialysis apparatus at a velocity sufficient to cause a pH of the treated water to be lower than a pH of the pre-treated water.

6. The method of claim 1, further comprising applying a voltage across an anode and a cathode of the electrodialysis apparatus above an active polarization voltage at an anion permeable membrane of the electrodialysis apparatus.

7. The method of claim 6, further comprising flowing the pre-treated water through diluting compartments of the electrodialysis apparatus at a flow rate sufficient to cause a pH of the treated water to be lower than a pH of the pre-treated water.

8. The method of claim 1, further comprising applying a voltage across an anode and a cathode of the electrodialysis apparatus above an active polarization voltage at a cation permeable membrane of the electrodialysis apparatus.

9. The method of claim 8, further comprising flowing the pre-treated water through diluting compartments of the electrodialysis apparatus at a flow rate sufficient to cause a pH of interstitial water in the cation permeable membrane to have a lower pH with respect to the treated water.

10. The method of claim 1, further comprising applying a voltage across an anode and a cathode of the electrodialysis apparatus at a selected active depleting stream voltage gradient.

11. The method of claim 10, further comprising operating the electrodialysis apparatus at a selected ion depleting membrane surface velocity, pH condition, temperature, polarization condition, and/or relative boundary layer concentration conditions of specific multivalent anions and/or cations relative to monovalent anions and/or cations such that anionic or cationic intermediates or ionic complexes are formed at the membrane surfaces either in connection with in-situ production of hydrogen or hydroxide ions or preferentially to any in-situ production of hydrogen or hydroxide ions.

12. The method of claim 11, further comprising operating the electrodialysis apparatus under conditions in which the anionic or cationic intermediates or complexes become relatively more permeable or less impermeable through either or both of the anionic or cationic selective membranes than these anions and/or cations or neutral constituents would be under equilibrium well-mixed conditions in the absence of an electric field.

13. The method of claim 1, wherein feeding the pre-treated water to the electrodialysis apparatus comprises feeding pre-treated water including monovalent and divalent anions and cations to the electrodialysis apparatus.

14. The method of claim 13, wherein feeding the pre-treated water to the electrodialysis apparatus comprises feeding a pre-treated one of seawater, brackish water, fresh water, and produced water to the electrodialysis apparatus.

15. The method of claim 13, wherein feeding the pre-treated water to the electrodialysis apparatus comprises feeding water having a greater molal concentration of sodium ion than a concentration of calcium ion to the electrodialysis apparatus.

16. The method of claim 13, wherein feeding the pre-treated water to the electrodialysis apparatus comprises feeding water having a greater molal concentration of chloride ion than a concentration of sulfate ion to the electrodialysis apparatus.

17. The method of claim 1, wherein selectively removing one or both of the monovalent anionic and the monovalent cationic species from the pre-treated water comprises removing a greater fraction of one or more of sodium ions, potassium ions, chloride ions, bicarbonate ions, nitrate ions, hydrogen selenate, hydrogen selenite ions or other monovalent ionic species from the pre-treated water relative to a fraction removal of multivalent ionic species.

18. The method of claim 17, wherein retaining the one or both of the multivalent cationic and the multivalent anionic species in the pre-treated water comprises retaining a greater fraction of one or more of magnesium ions, calcium ions, strontium ions, carbonate ions, selenate ions, selenite ions, sulfate ions, or other multivalent ionic species in the pre-treated water relative to a fraction removal of monovalent ionic species.

19. The method of claim 1, comprising operating the electrodialysis apparatus at a current efficiency of at least about 70%.

20. The method of claim 19, comprising operating the electrodialysis apparatus under conditions above an active polarization voltage in which hydrogen ions are produced at an anion selective membrane of a diluting compartment of the electrodialysis apparatus and/or in which hydroxide ions are produced at a cation selective membrane of a diluting compartment of the electrodialysis apparatus.

21. The method of claim 20, further comprising operating the electrodialysis apparatus under active polarization voltage conditions in which one or more of hydrogen sulfate, bicarbonate, borate, hydrogen selenate, or hydrogen selenite ions pass through the anion selective membrane into a concentrating compartment of the electrodialysis apparatus.

22. The method of claim 19, further comprising operating the electrodialysis apparatus under active polarization voltage conditions in which ionic complexes including one of calcium hydrogen boron ($CaH_2BO_3^+$) or magnesium hydrogen boron ($MgH_2BO_3^+$) pass through the cation selective membrane into a concentrating compartment of the electrodialysis system.

23. The method of claim 1, comprising operating the electrodialysis apparatus at a current efficiency of at least about 85%.

24. The method of claim 1, further comprising producing the pre-treated water by filtering untreated feed water to remove particulate matter having a size greater than 50 micrometers.

25. The method of claim 1, further comprising adding sulfuric acid or hydrochloric acid to the pre-treated water entering as feed water to the electrodialysis apparatus from a source external to the electrodialysis apparatus.

26. The method of claim 1, wherein producing the pre-treated water from untreated feed water further comprises adding sulfuric acid or hydrochloric acid to the untreated feed water.

27. The method of claim 1, further comprising removing dissolved gaseous components from the untreated feed water.

28. The method of claim 1, wherein producing the pre-treated water from the untreated feed water further comprises creating in-situ oxidizing conditions within the untreated feed water by one or more of aerating the untreated feed water with oxygen-containing gas, use of oxidizing and disinfecting compounds including one or more of ozone, chlorine, and chlorine dioxide, and treatment via filtration through a media bed comprising an oxidizing media.

29. The method of claim 1, wherein producing the pre-treated water from the untreated feed water further comprises treating the untreated feed water in a forced draft degasifier.

30. The method of claim 1, further comprising generating oxidizing compounds or pH adjusting compounds using constituents of purified or speciated products of a concentrating stream of the electrodialysis apparatus as raw materials, and treating the oxidizing compounds or pH adjusting compounds in an electrochemical oxidation/reduction apparatus to produce chemicals utilized by a pre-treatment system to produce the pre-treated water.

31. The method of claim 1, further comprising:
monitoring a concentration of sodium in the treated water stream; and
adjusting an operating parameter of the electrodialysis device to maintain a desired SAR value or a concentration of a specific ionic or non-ionic constituent in the treated water stream and/or a concentrate water stream of the electrodialysis apparatus.

32. The method of claim 31, further comprising:
determining a SAR value of treated water in the treated water stream; and
adjusting one or both of an operating current of the electrodialysis device and a pH of feed water to the electrodialysis apparatus to maintain one or more of the desired SAR value and pH in the treated water stream and/or a concentrate water stream from the electrodialysis apparatus.

33. The method of claim 1, further comprising utilizing a concentrate stream effluent produced in the electrodialysis device to produce reagents used as raw materials to condition and pre-treat untreated feed water to the electrodialysis apparatus.

34. The method of claim 1, further comprising utilizing a concentrate stream effluent produced in the electrodialysis device to generate heat or electricity.

35. The method of claim 34, wherein generating the heat or electricity from the concentrate stream includes directing the concentrate stream into a solar pond.

36. The method of claim 35, further comprising selectively causing evaporative processes to speciate purified solid chemical compounds.

37. The method of claim 1, further comprising producing reagents for further use from concentrate water from the electrodialysis apparatus using one or a combination of distillation, chromatographic ion retardation processes, crystallization, and selective evaporation.

38. The method of claim 1, further comprising irrigating a soil with the treated water from the irrigation distribution system, monitoring the electrical resistance of the soil, and adjusting the rate of irrigation of the soil based at least in part on the electrical resistance.

39. A method of providing water suitable for irrigation use, the method comprising:
feeding pre-treated water to an electrodialysis apparatus;
treating the pre-treated water in the electrodialysis apparatus by selectively removing a fraction of either one or both of monovalent anionic and monovalent cationic species from the pre-treated water while preferentially retaining either one or both of multivalent anionic and multivalent cationic species to produce a treated water stream having a lower ratio of monovalent ions to multivalent ions than the pre-treated water, by applying a voltage across an anode and a cathode of the electrodialysis apparatus above an active polarization voltage at a cation permeable membrane of the electrodialysis apparatus, and by flowing the pre-treated water through diluting compartments of the electrodialysis apparatus at a flow rate sufficient to cause a pH of interstitial water in the cation permeable membrane to have a lower pH with respect to the treated water; and
directing the treated water into an irrigation water distribution system.

40. A method of providing water suitable for irrigation use, the method comprising:
feeding pre-treated water to an electrodialysis apparatus;
treating the pre-treated water in the electrodialysis apparatus by selectively removing a fraction of either one or both of monovalent anionic and monovalent cationic species from the pre-treated water while preferentially retaining either one or both of multivalent anionic and multivalent cationic species to produce a treated water stream having a lower ratio of monovalent ions to multivalent ions than the pre-treated water, by applying a voltage across an anode and a cathode of the electrodialysis apparatus at a selected active depleting stream voltage gradient, and by operating the electrodialysis apparatus at a selected ion depleting membrane surface velocity, pH condition, temperature, polarization condition, and/or relative boundary layer concentration conditions of specific multivalent anions and/or cations relative to monovalent anions and/or cations such that anionic or cationic intermediates or ionic complexes are formed at the membrane surfaces either in connection with in-situ production of hydrogen or hydroxide ions or preferentially to any in-situ production of hydrogen or hydroxide ions; and
directing the treated water into an irrigation water distribution system.

41. A method of providing water suitable for irrigation use, the method comprising:
feeding pre-treated water to an electrodialysis apparatus;
treating the pre-treated water in the electrodialysis apparatus by selectively removing a fraction of either one or both of monovalent anionic and monovalent cationic species from the pre-treated water while preferentially retaining either one or both of multivalent anionic and multivalent cationic species to produce a treated water stream having a lower ratio of monovalent ions to multivalent ions than the pre-treated water, by operating the electrodialysis apparatus at a current efficiency of at least about 70%, by operating the electrodialysis apparatus under conditions above an active polarization voltage in which hydrogen ions are produced at an anion selective membrane of a diluting compartment of the electrodialysis apparatus and/or in which hydroxide ions are produced at a cation selective membrane of a diluting compartment of the electrodialysis apparatus, and by operating the electrodialysis apparatus under active polarization voltage conditions in which one or more of hydrogen sulfate, bicarbonate, borate, hydrogen selenate, or hydrogen selenite ions pass through the anion selective membrane into a concentrating compartment of the electrodialysis apparatus; and directing the treated water into an irrigation water distribution system.

\* \* \* \* \*